United States Patent
Hoyt, III

[15] 3,650,620
[45] Mar. 21, 1972

[54] AUTOMATED XEROGRAPHIC PROCESSING SYSTEM

[72] Inventor: Hazen L. Hoyt, III, Glendora, Calif.
[73] Assignee: Xerox Corporation, Rochester, N.Y.
[22] Filed: Nov. 7, 1969
[21] Appl. No.: 874,834

[52] U.S. Cl. .................................355/3, 355/16, 95/12.5
[51] Int. Cl. .........................................................G03g 15/22
[58] Field of Search .................................355/3, 16; 95/12.5

[56] References Cited

UNITED STATES PATENTS

| | | | |
|---|---|---|---|
| 2,892,391 | 6/1959 | Mayo et al. | 355/3 |
| 3,091,160 | 5/1963 | Crumrine et al. | 95/12.5 X |
| 3,229,603 | 1/1966 | Boschet | 355/16 X |

Primary Examiner—Samuel S. Matthews
Assistant Examiner—E. M. Bero
Attorney—James J. Ralabate, John E. Beck, Franklyn C. Weiss and Irving Keschner

[57] ABSTRACT

An automated flat-plate xerographic processing system especially adapted for use in the field of medical diagnostics. In this system, exposure of the uniformly charged xerographic plate takes place outside of the xerographic processing apparatus such that the test object may be selectively positioned with respect to the radiation source and the xerographic plate. To permit such exposure, the processing system includes a light-tight cassette into which the uniformly charged xerographic plate is inserted and held until automatically withdrawn, after exposure, by the development apparatus.

The charging apparatus includes means for receiving and opening the light-tight cassette, means for inserting the charged xerographic plate therein without disturbing the uniform electrostatic charge thereon and means for closing the cassette. The development apparatus includes means for receiving and opening the cassette without further exposure of the xerographic plate to actinic electromagnetic radiation, the xerographic plate being held in the proper alignment for removal from the cassette, and means for withdrawing the xerographic plate from the cassette and for advancing the xerographic plate to the development means without disturbing the latent electrostatic image thereon.

49 Claims, 27 Drawing Figures

Patented March 21, 1972
3,650,620
15 Sheets-Sheet 1
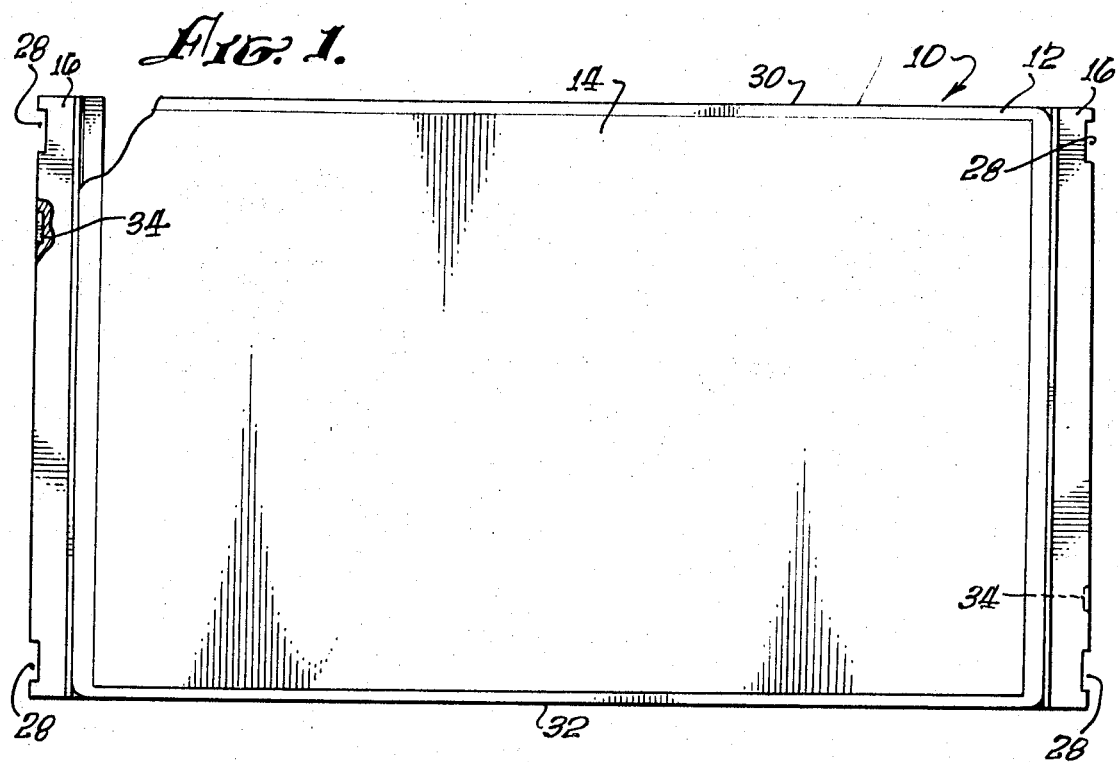
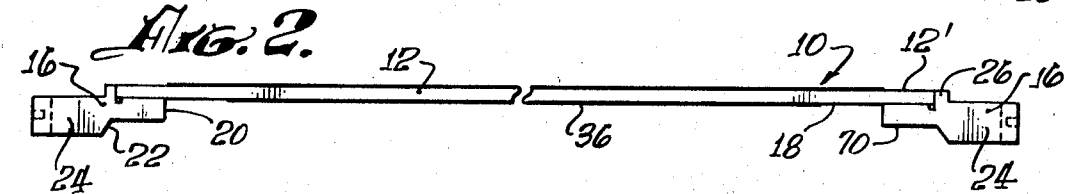
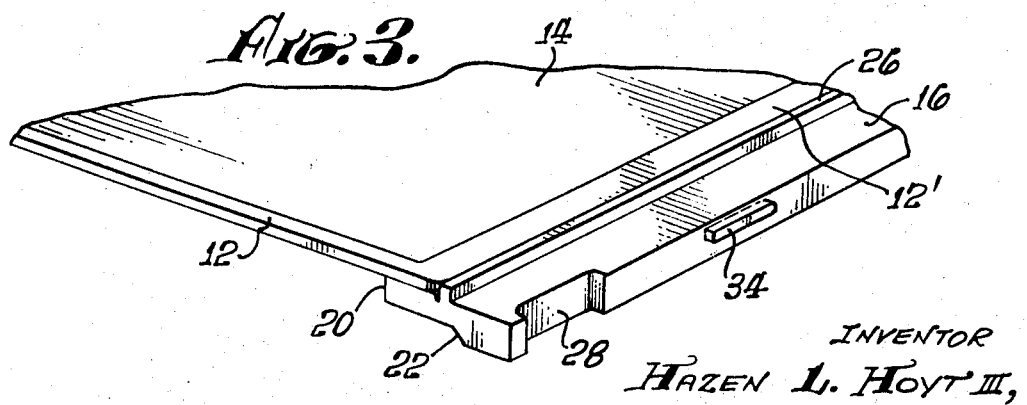
INVENTOR
HAZEN L. HOYT III,
By Joseph Hirsch
ATTORNEY Patented March 21, 1972  3,650,620
15 Sheets-Sheet 2
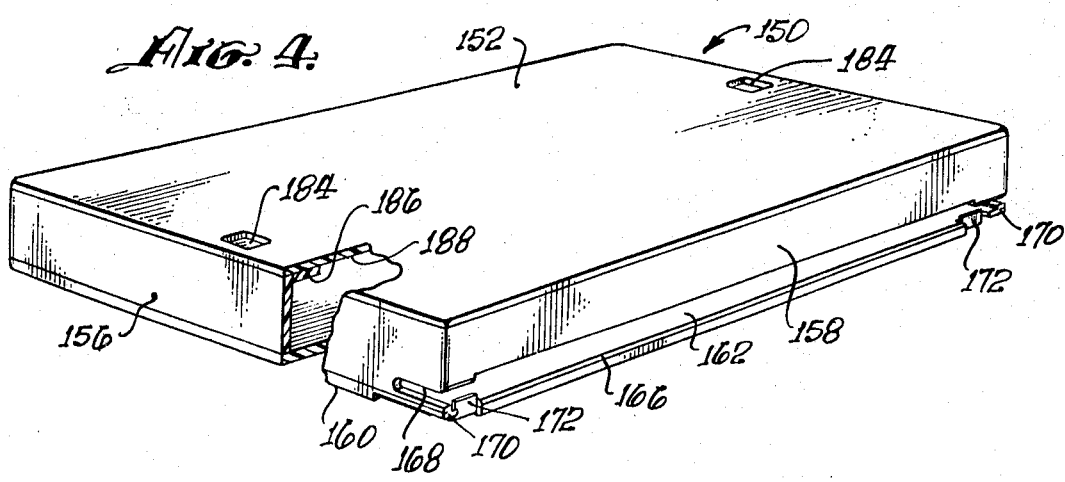
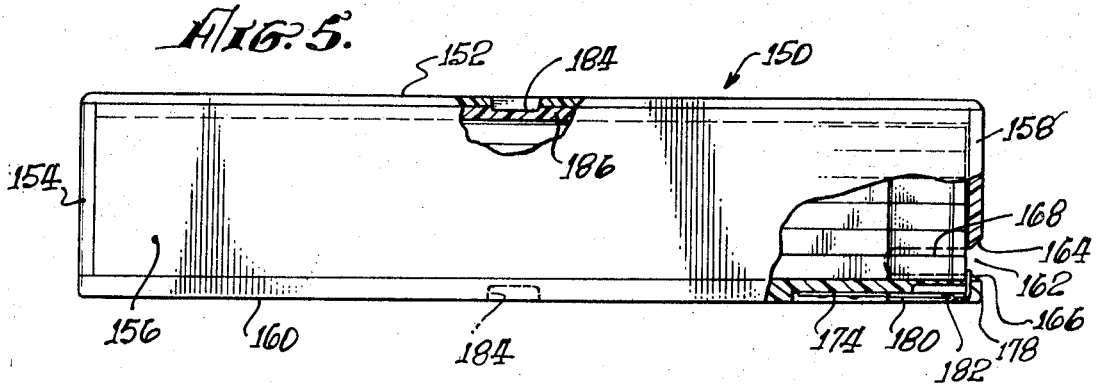
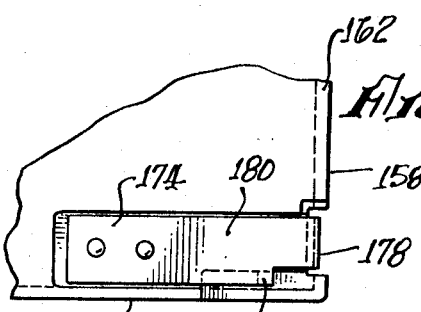
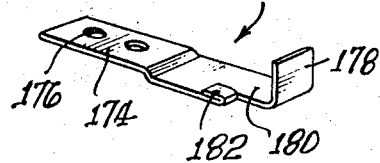

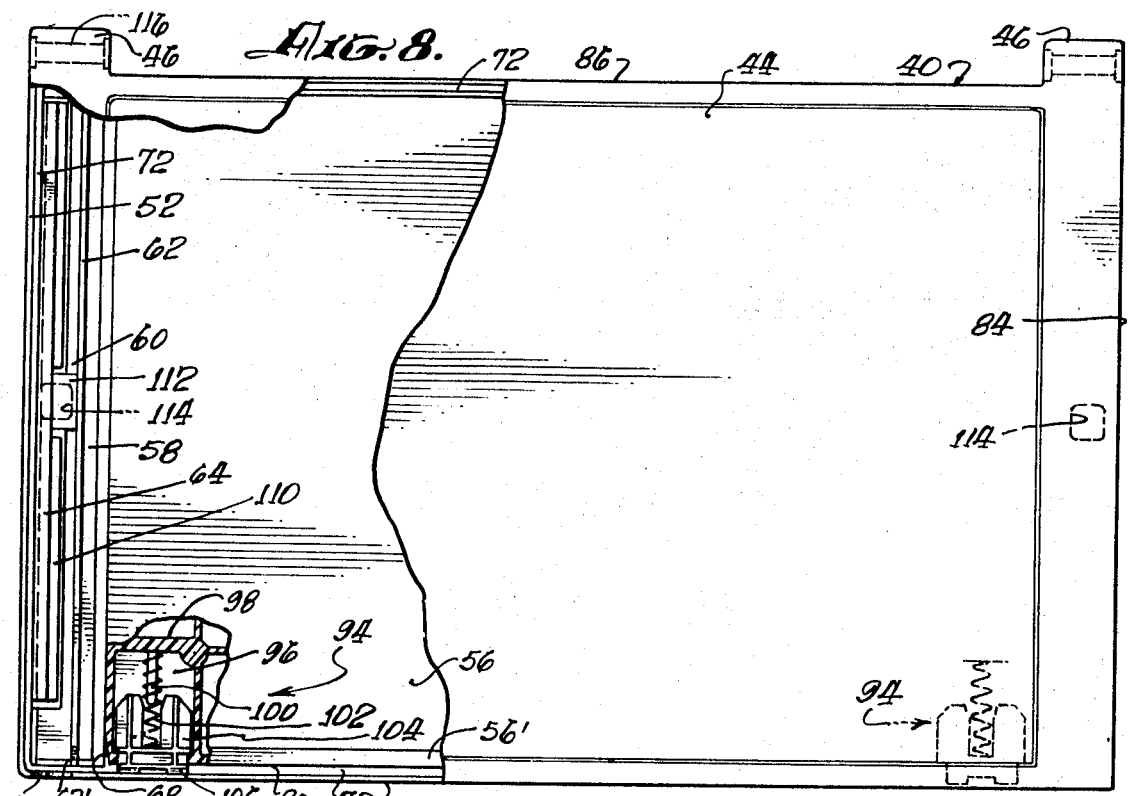
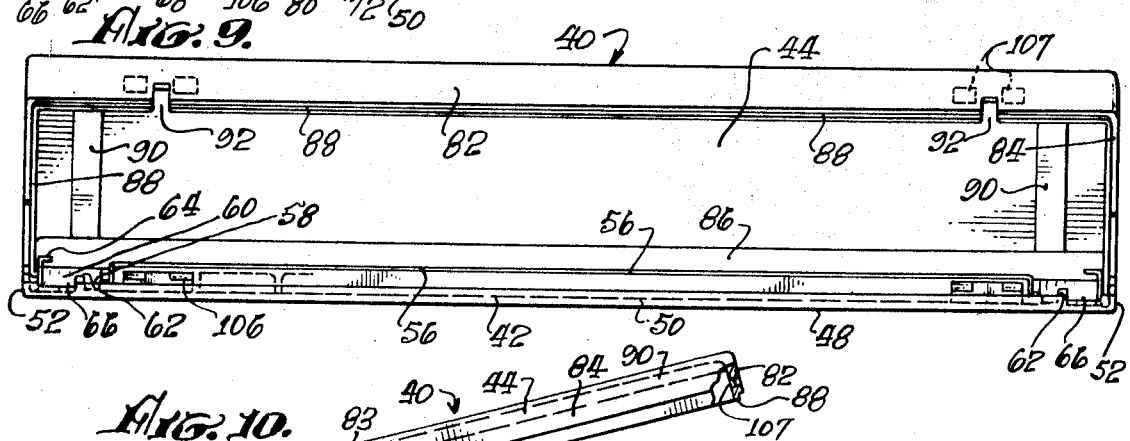
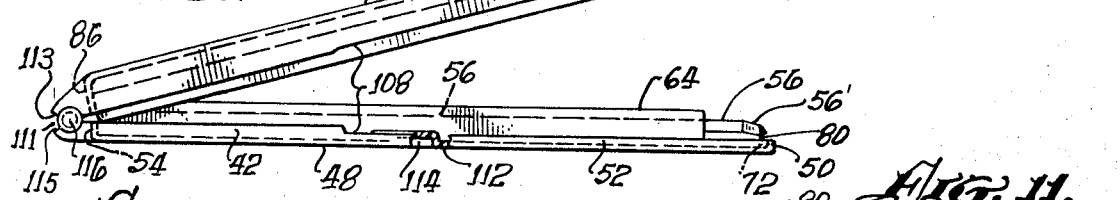
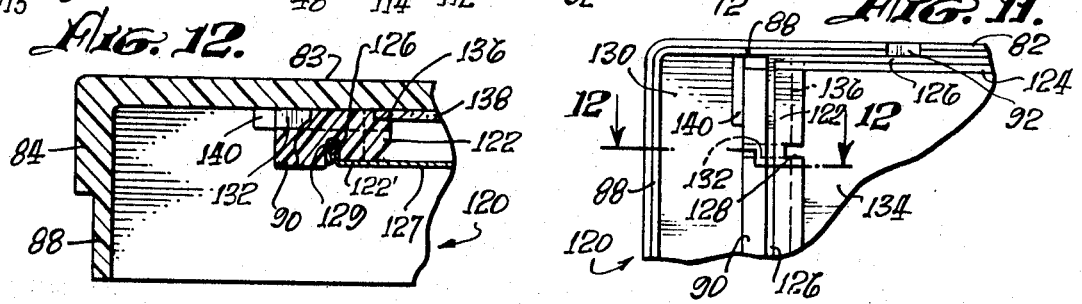

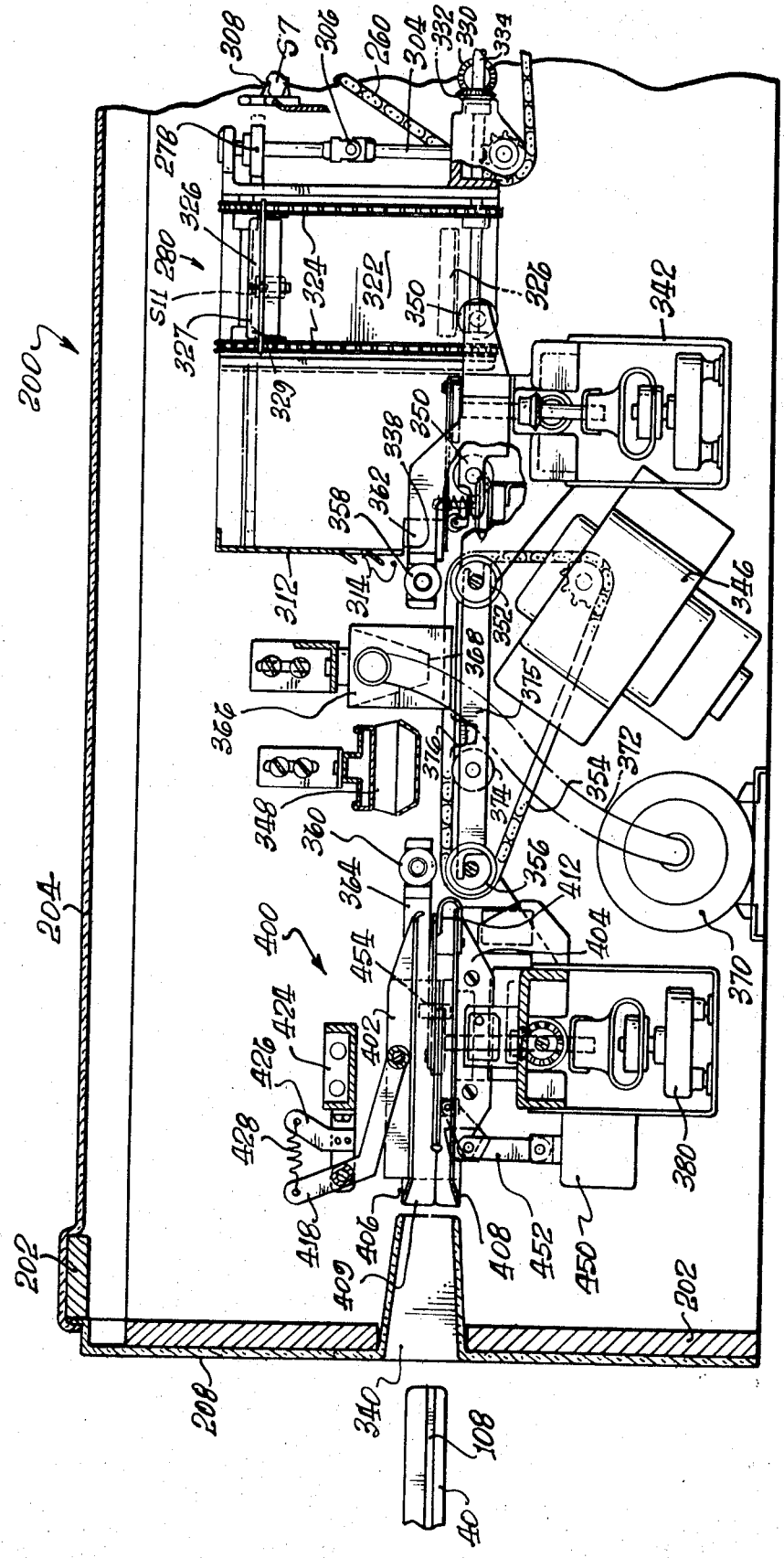

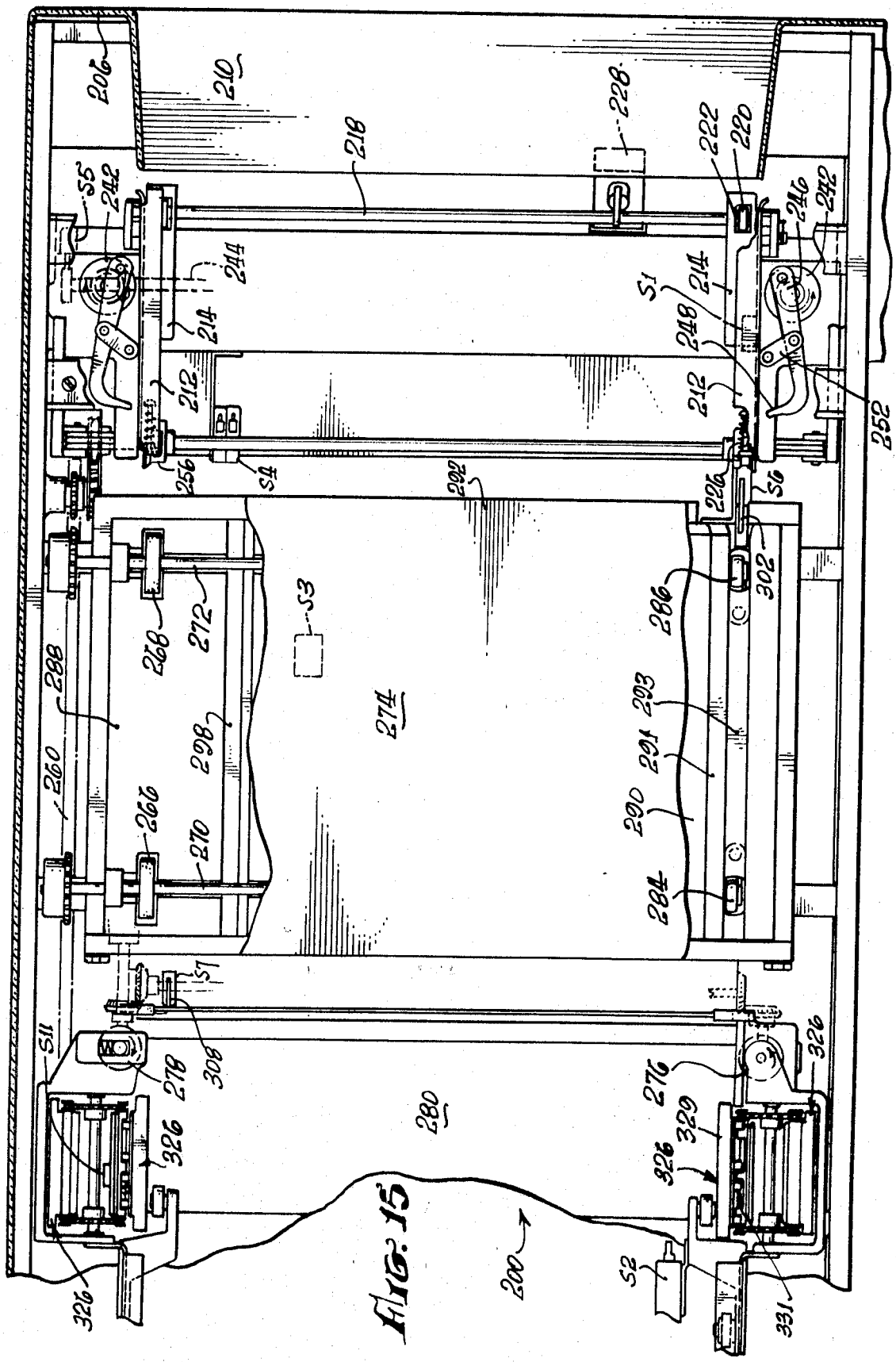

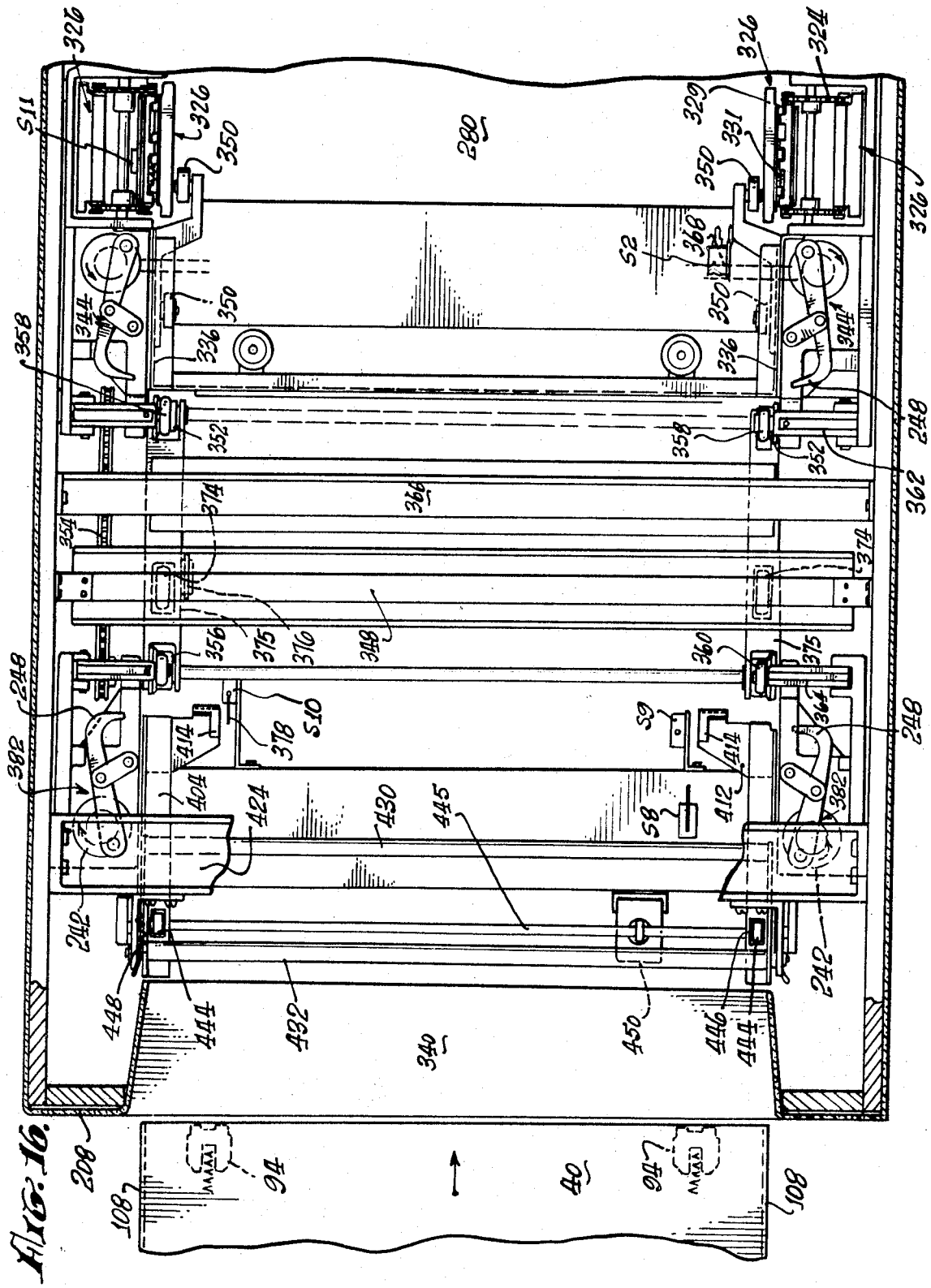

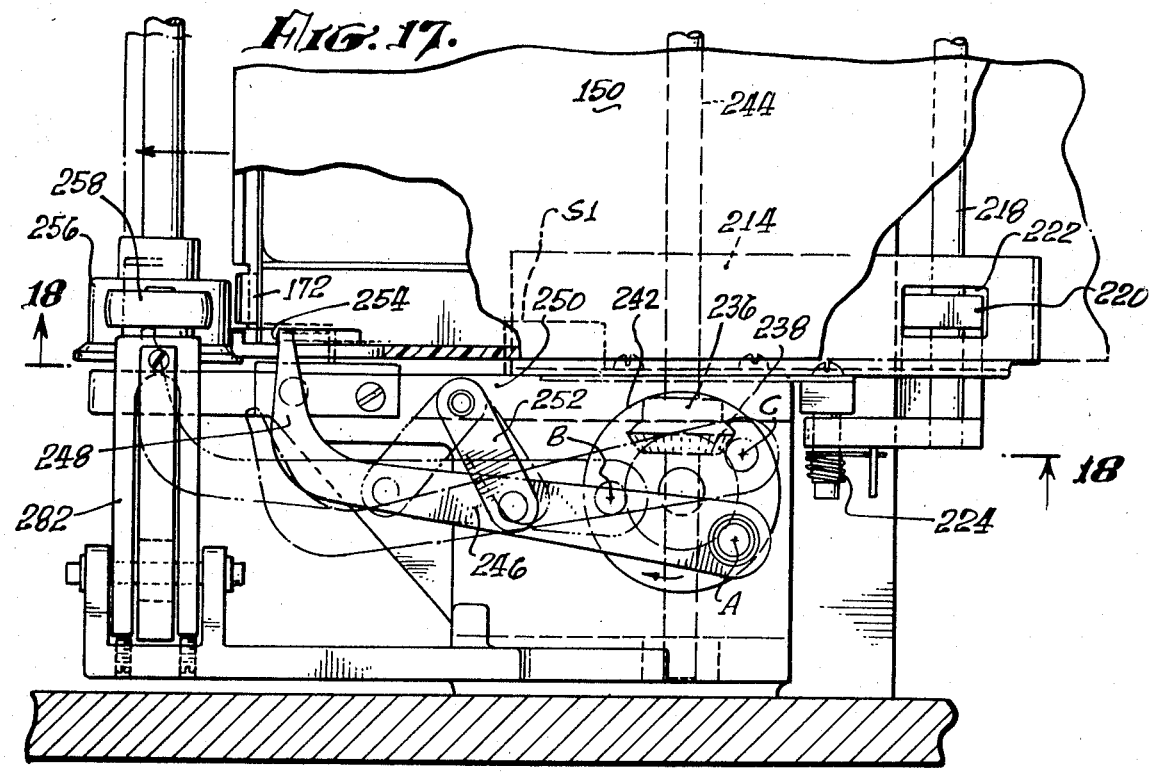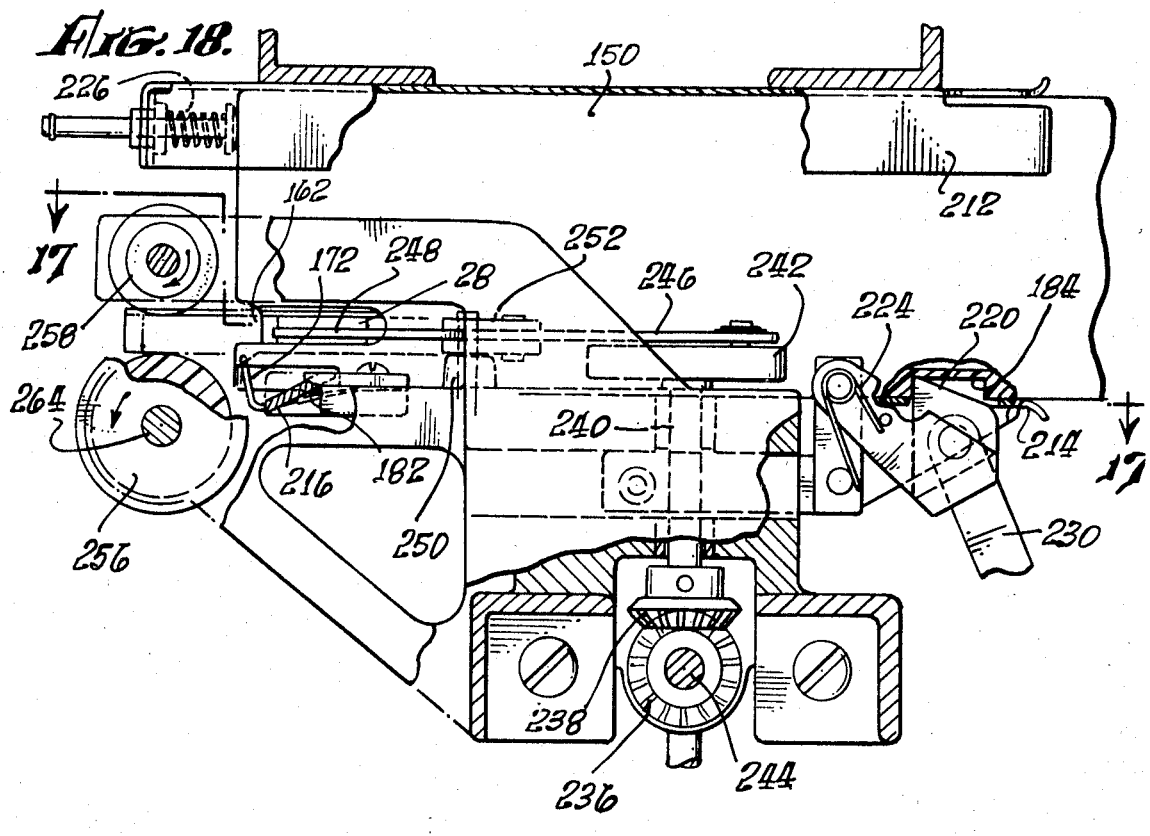

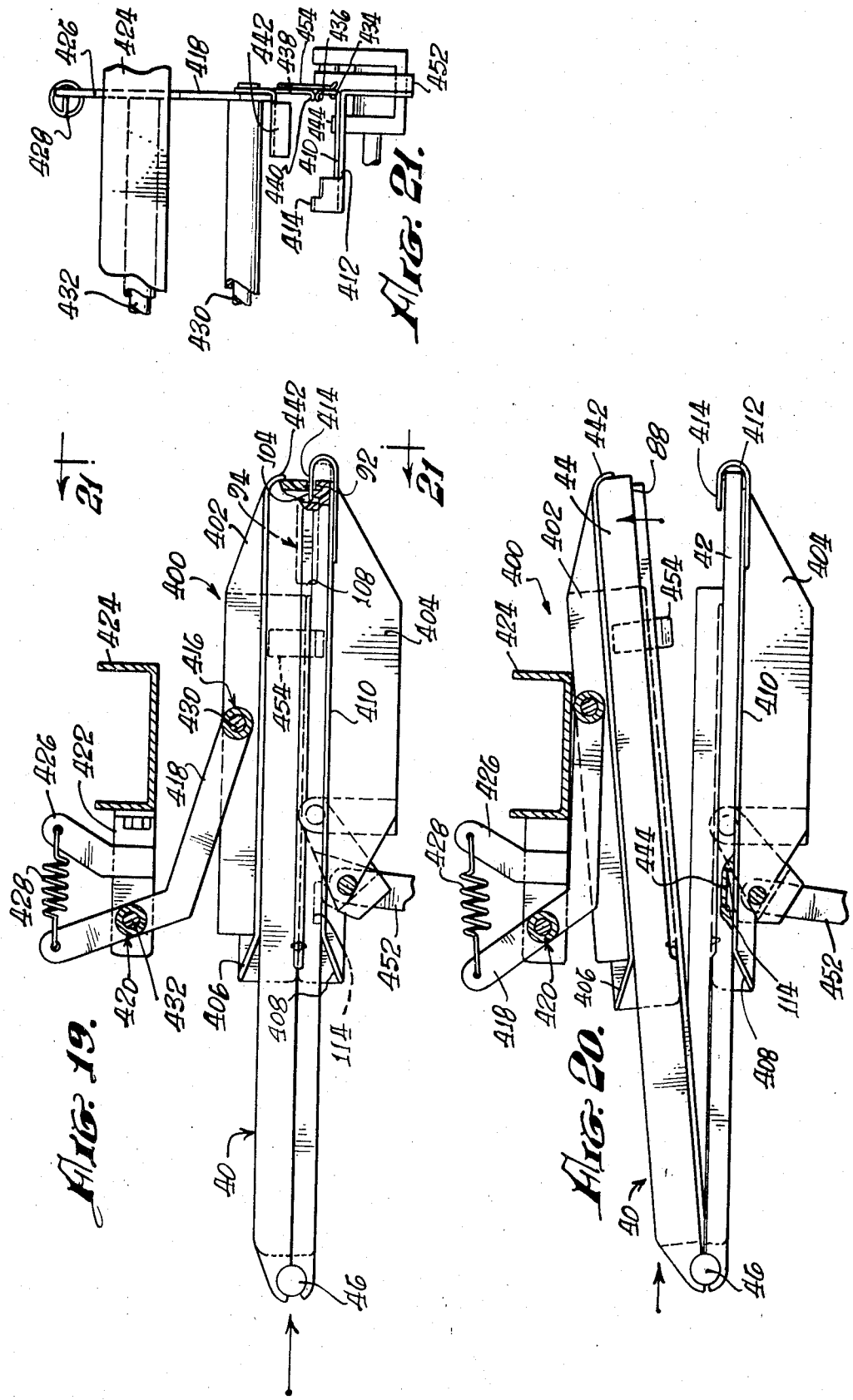

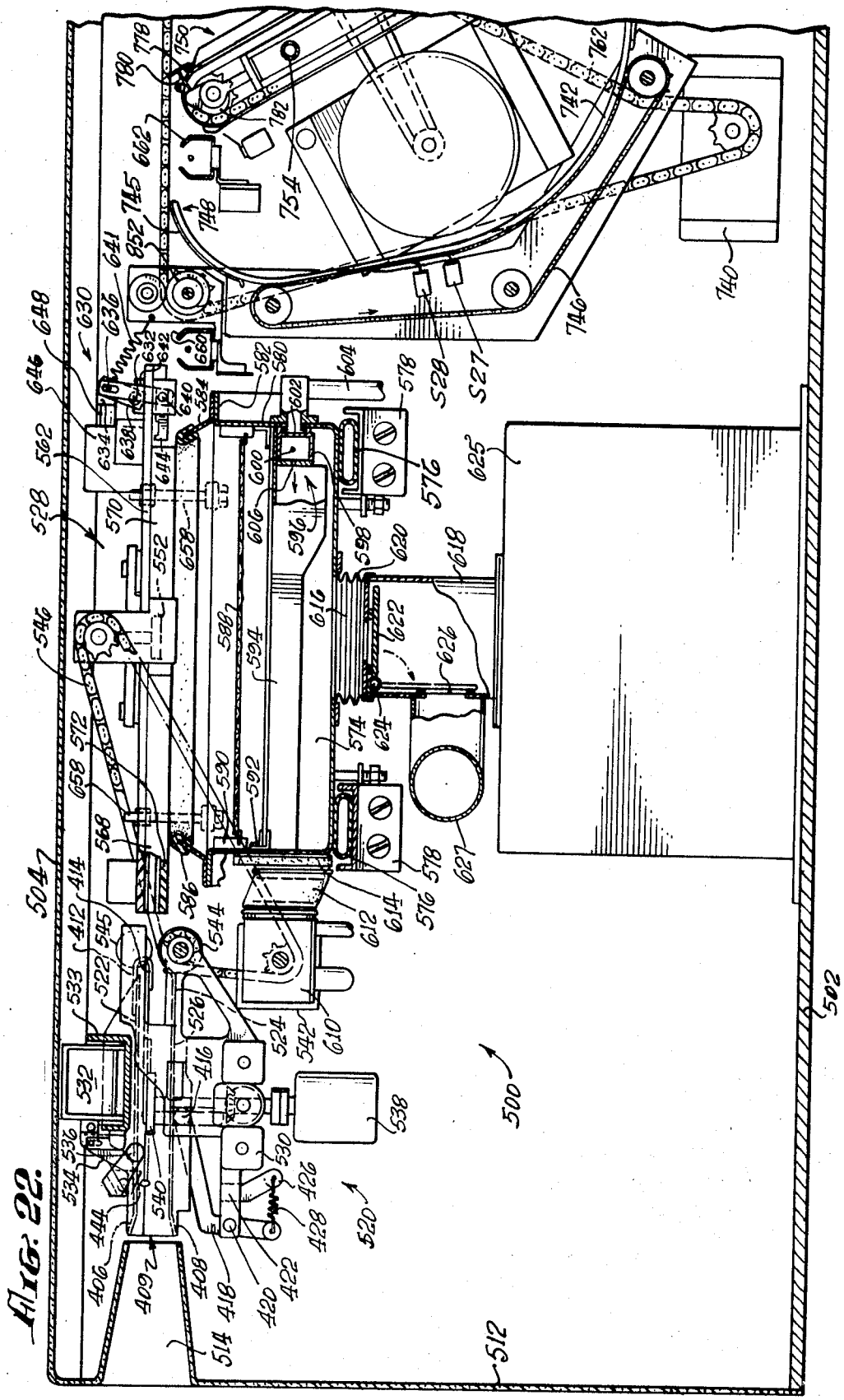

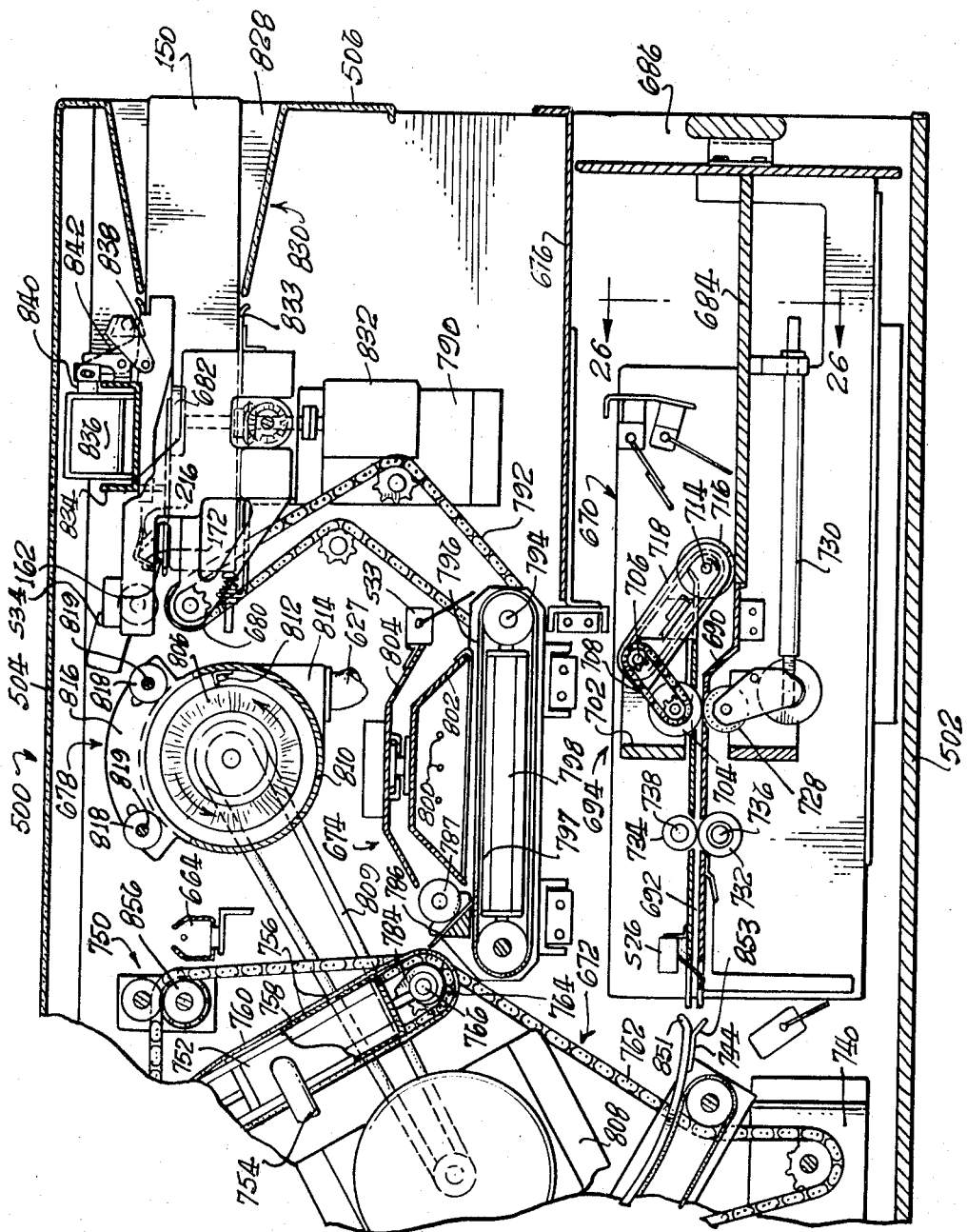

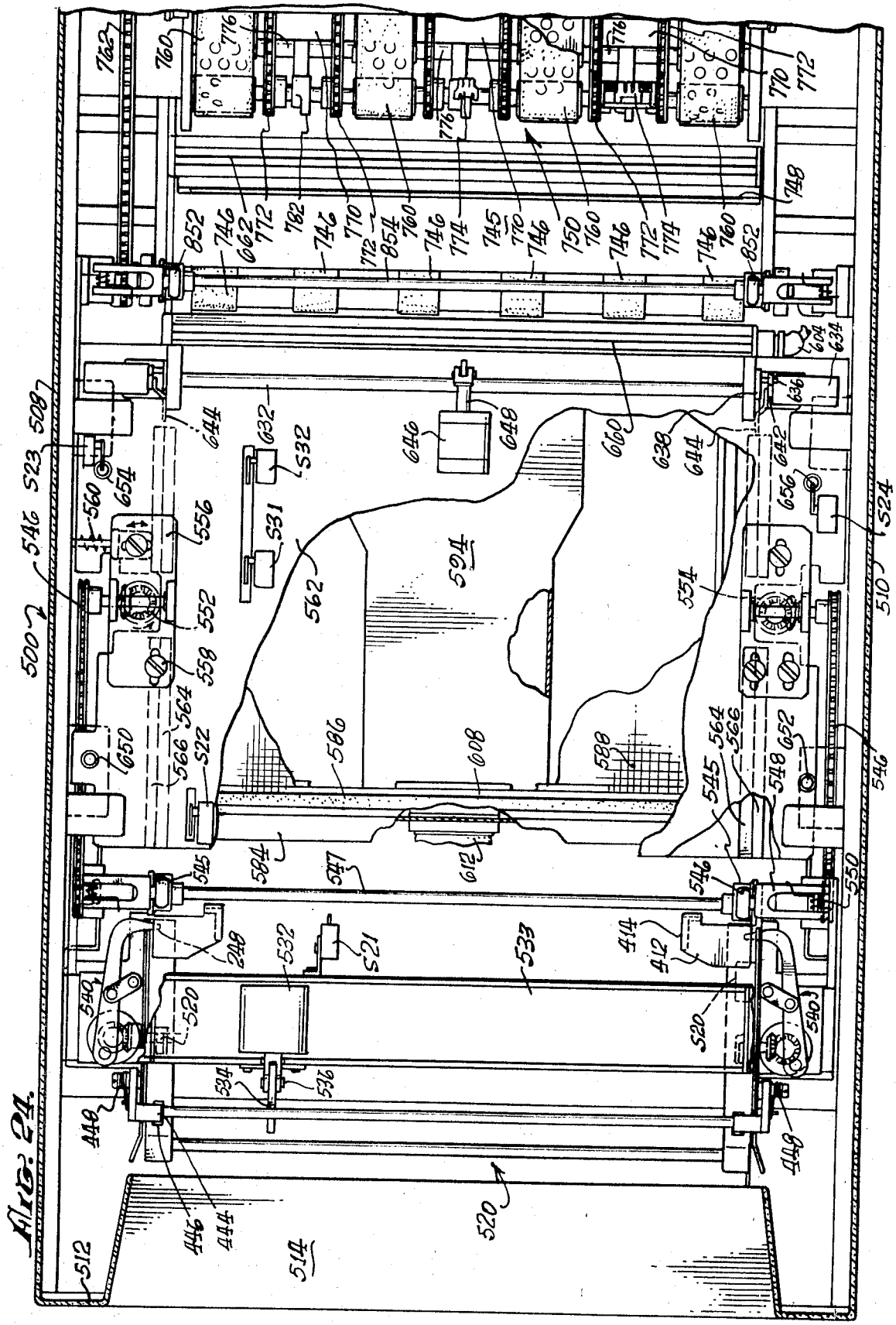

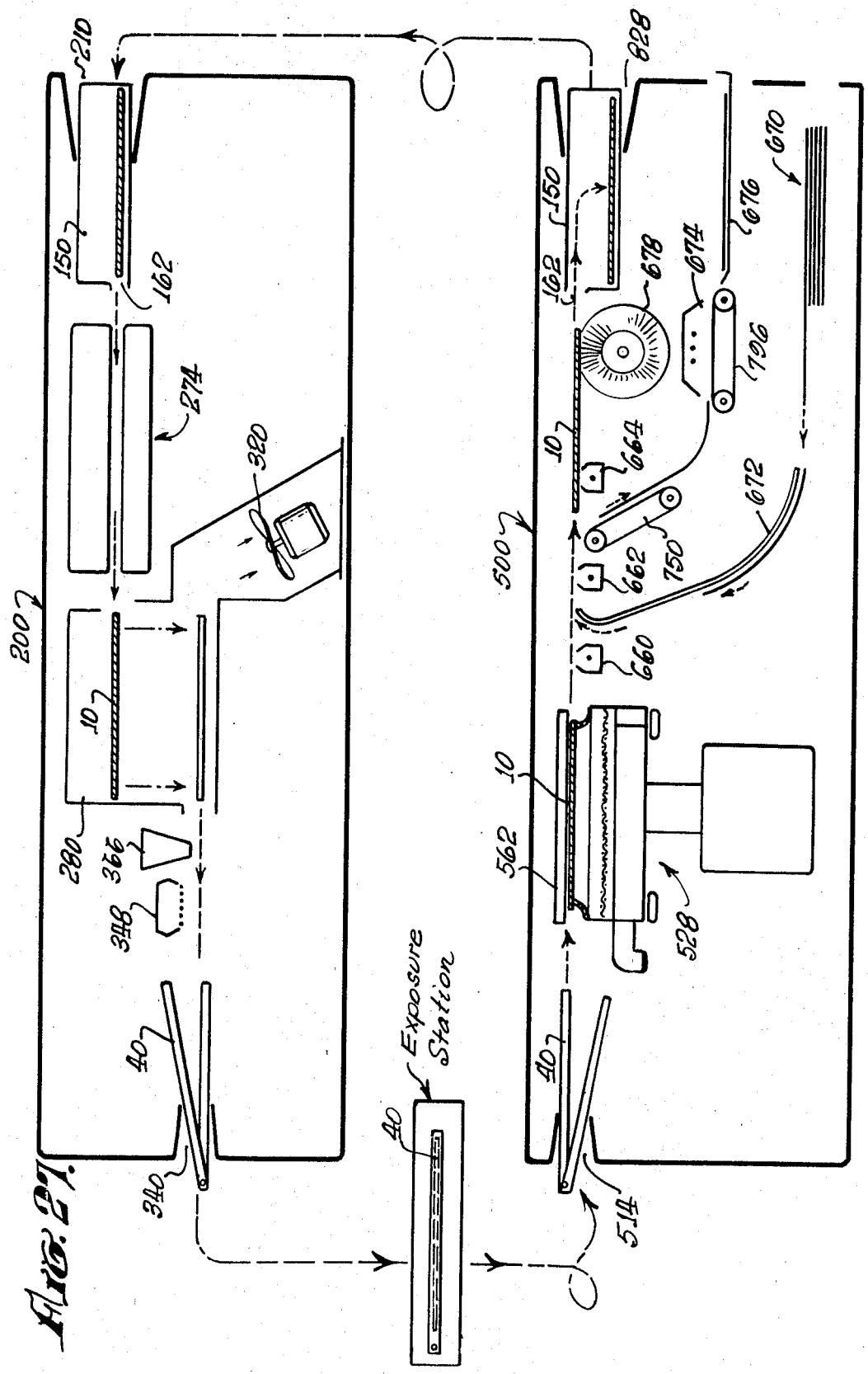

AUTOMATED XEROGRAPHIC PROCESSING SYSTEM

BACKGROUND OF THE INVENTION

This invention relates to the field of xerography and, more particularly, to an automated xerographic processing system adapted for use in the field of medical diagnostics.

In the xerographic process as described in U.S. Pat. No. 2,297,691 to C. F. Carlson, a base plate of relatively low electrical resistance such as metal, paper, etc., having a photoconductive insulating layer coated thereon, is electrostatically charged in the dark. The charged coating is then exposed to a light image. The charges leak off rapidly to the base plate in proportion to the intensity of light to which any given area is exposed, the charge being substantially retained in non-exposed areas. After such exposure, the coating is contacted with electroscopic marking particles in the dark. When forming a positive image these particles adhere to the areas where the electrostatic charges remain whereby there is formed a xerographic powder image corresponding to the latent electrostatic image. The powder image can then be transferred to a sheet of transfer material resulting in a positive print having excellent detail and quality. Alternatively, when the base plate is relatively inexpensive as in the case of paper, it may be desirable to fix the powder image directly to the plate itself and thereby eliminate the image transfer operation.

Following the disclosure of the basic xerographic technique in the Carlson patent, many improvements have been made in the xerographic technique itself and in the various component devices for effecting xerographic processing. For the most part, such improvements have been employed in apparatus for reproducing line copy images, and such devices are presently in wide commercial use for that purpose. The art of xerography, however, is amenable to recording X-ray patterns such as might be attained by passing X-rays through a body to be analytically examined. The subsequent development process involves forming continuous tone images and therefore presents different problems than those normally associated with line copy devices.

The art of X-ray recording by xerography, generally known as xeroradiography, relates to the recording of X-ray patterns and information by means of materials and devices whose electrical conductivity is altered by the action of the X-rays reaching the recording medium. In xeroradiography, the plate or element exposed to the X-ray pattern usually comprises a metallic backing sheet having a photoconductive insulating layer or coating, for example, vitreous selenium, on one surface thereof. It is conventional to cover or protect the photoconductive coating from ambient light by a slide plate, usually called a dark slide, spaced from the photoconductive surface. The plate or element is sensitized by applying a uniform electrostatic charge to the coating and thereafter the charged plate is exposed to sensitizing radiation with the object to be examined appropriately interposed between the radiation source and the sensitized plate. Under influence of the X-rays emanating from the source which are differentially absorbed by different areas of the test body but which readily pass through the dark slide, the coating becomes electrically conductive in those portions reached by the sensitizing radiation, thereby permitting portions of the electrostatic charge thereon to be selectively dissipated. Dissipation of the electrostatic charge is proportional to the amount of radiation absorbed by the test body with greater dissipation occurring in those portions of the coating shaded by less absorptive portions of the object being radiographed. In this manner, an electrostatic latent image of the test body is formed on the photoconductive element. The image may then be made visible with an electroscopic marking material which clings to the electrostatically charged portions of the latent image. Reversal, or negative, prints can also be developed by contacting the latent electrostatic image with marking particles of the same polarity. The xeroradiographic process is disclosed, for example, in Schaffert et al. U.S. Pat. No. 2,666,144.

It has previously been recognized that xeroradiography can be applied in the field of medical diagnostics. For example, the xerographic process when utilized to examine extremities, such as hands and feet, has been characterized as being a valuable diagnostic technique since more information is recorded on the xerogram than is recorded on a corresponding radiogram.

In recent years, the xeroradiography technique has been utilized in the early detection and diagnosis of breast cancer in women. The process, known as xeromammography, has been described as being less expensive, requiring less radiation than non-screen film radiology, and one which gives greater detail in the mammogram to be reviewed by the radiologist. Additionally, a most important advantage is in the speed of interpretation of the xeromammogram. Because they are easier to interpret, and, accordingly, reduce the fatigue on the examining radiologist thereby increasing his overall effectiveness, the technique is believed to have application in screening techniques for the early detection of breast cancer.

Present automatic xerographic document reproducing equipment, such as line copy devices, however, are not suited for the xeroradiographic examinations as it would be associated with medical diagnostics. Medical examination generally entails the proper positioning of the patient and, particularly, proper positioning of that body portion or section being examined in relation to the sensitized xerographic plate and the radiation source. Present line-copying devices have not been designed with this feature in mind. In general, the exposure apparatus have been built into the machine such that selective positioning of patient, sensitized plate and radiation source cannot be achieved. Furthermore, present line copy devices have the radiation source physically built into the exposure means. This feature makes such devices unsuited for xeroradiographic examination where the radiation source must be positioned on the opposite side of the test body from the sensitized plate. Since X-rays pass through the test body, being differentially absorbed by different portions thereof, as opposed to being reflected from the object being duplicated as in line-copy devices, the reflective objects presently built into xerographic processing systems are not amenable to xeroradiographic examination.

Notwithstanding the drawbacks of present xerographic equipment with regard to the specialized case of xeroradiographic examination, and in particular the analytical examination of body portions sufficiently limited in thickness and density to permit such examination, it would be desirable to have an automated xerographic processing system adapted for the processing of xeroradiograms.

OBJECTS OF THE INVENTION

It is, therefore, the primary object of the present invention to provide an automated xerographic processing system.

It is a further object of the present invention to provide an automated xeroradiographic processing system wherein the exposure of the sensitized plate to the X-ray pattern is outside the processing apparatus whereby maximum flexibility is given to the radiologist in positioning the test body relative to the sensitized xerographic plate.

It is a further object of the present invention to provide an automated xeroradiographic processing system wherein exposure of the sensitized xerographic plate is made outside of the processing apparatus yet the uniformly charged, or latent electrostatic image-bearing, xerographic plate is not subjected to degrading ambient electromagnetic radiation.

It is a further object of the present invention to provide an automated xeroradiographic processing system amenable to mass screening for the early detection and diagnosis of breast cancer in women.

Still a further object of the present invention is to provide charging and printing apparatus which can concomitantly service a plurality of remotely located exposure stations.

Still a further object of the present invention is to provide a charging apparatus for uniformly charging the photoconductive surface of a xerographic plate which includes means to hold a light-tight cassette and means to insert the uniformly charged xerographic plate therein without subjecting the charged plate to actinic, ambient electromagnetic radiation.

Still a further object of the present invention is to provide printing apparatus for developing a latent electrostatic image on a xerographic plate into a visible image suitable for visual examination, said printing apparatus including means to receive a light-tight cassette having a latent electrostatic image-bearing xerographic plate therein, and means to open the cassette and withdraw the image-bearing xerographic plate therefrom without adversely degrading the latent electrostatic image.

These and still further objects, features and advantages of the present invention will become apparent upon consideration of the following detailed disclosure.

BRIEF SUMMARY OF THE INVENTION

The above and still further objects of the present invention are achieved, in accordance therewith, by providing an automated flat-plate xerographic processing system including charging means for placing a uniform electrostatic charge on the photoconductive surface of a xerographic plate, means for holding a light-tight cassette into which the xerographic plate can be inserted, means for opening said cassette and for inserting the charged xerographic plate therein without exposing the charged plate to actinic electromagnetic radiation, means for receiving the xerographic plate-holding cassette after imaging exposure, the xerographic plate having thereon a latent electrostatic image suitable for subsequent development, means for opening the cassette and for withdrawing the latent electrostatic image-bearing xerographic plate from the cassette without further exposure of the xerographic plate to actinic electromagnetic radiation, means for developing the latent electrostatic image to form a reproduction thereof suitable for visual examination, and means for advancing the xerographic plate to the developing means without disturbing the latent electrostatic image thereon.

In one form of the invention the xerographic processing apparatus comprises two units, a charging unit and a printing unit. The charging unit comprises, in its essential elements, means for placing a uniform electrostatic charge on the photoconductive surface of the xerographic plate, the charging means including means for causing relative movement of the xerographic plate and the charging means whereby uniform electrostatic charging is achieved, means for holding a light-tight cassette into which the charged xerographic plate can be inserted, means for opening the cassette and for inserting the charged xerographic plate therein, whereafter the cassette is closed thereby holding the charged xerographic plate in a light-tight environment. The plate-holding cassette is withdrawn from the charging unit and taken to the exposure station where, after appropriate positioning of the test body and the radiation source with respect to the plate, the plate is exposed to sensitizing radiation. As is conventional in the xerographic process, a latent electrostatic image results which is capable of subsequent development into a reproduction suitable for visual examination.

To achieve such development, the cassette having the latent electrostatic image-bearing xerographic plate therein is transported from the exposure station to the printing unit. The printing unit comprises, in its essential elements, means for receiving the xerographic plate-holding cassette, means for opening the cassette without further exposure of the xerographic plate to actinic electromagnetic radiation, means for withdrawing the latent electrostatic image-bearing xerographic plate from the cassette, means for developing the latent electrostatic image on the xerographic plate to form a reproduction thereof suitable for visual examination, and means for advancing the xerographic plate to the developing means without disturbing the latent electrostatic image thereon. When the cassette is inserted into the printing unit, it is automatically opened and the electrostatic image-bearing plate therein removed without additional exposure of the plate to actinic radiation or other disturbance of the electrostatic charge pattern thereon. The plate is transported to the developing means wherein the latent electrostatic image thereon is converted to a xerographic powder image capable of being fixed to the xerographic member or transferred to a suitable support surface. When the xerographic plate is of the reusable type (e.g., vitreous selenium plate), it is conventional to transfer the xerographic powder image to a support surface, after which the plate is cleaned of residual toner and reused. To achieve such transfer, there is provided means to advance the support surface adjacent to the powder image-bearing plate surface and means to electrostatically charge the reverse side of the support to a polarity opposite the polarity of the toner material, whereby the powder image is faithfully and accurately transferred from the xerographic plate to the support surface. The image is thereafter fused to the support surface so that a relatively permanent reproduction is obtained. The xerographic plate is advanced to a cleaning station wherein cleaning means remove residual toner from the photoconductive surface so that the plate can be recycled for subsequent examinations.

In this system, exposure of the uniformly charged xerographic plate takes place outside of the xerographic processing apparatus. This feature enables the radiologist, when considering medical examinations, to selectively position a patient, and particularly those portions of the patient's body being examined, with respect to the radiation source and the xerographic plate. To permit such exposure outside the processing apparatus, the processing system herein described includes a light-tight cassette into which the uniformly charged xerographic plate is inserted. This is achieved automatically in the charging unit as the charged plate leaves the charging station. After the plate is inserted into the cassette, the cassette closes so that the charged plate is securely maintained in a light-tight environment. Exposure of the plate to undesired actinic radiation, such as ambient radiation to which the plate is sensitive, is thereby avoided. After the plate is exposed to the imaging radiation which is passed through the test body, the cassette is transported to the printing unit where, upon insertion, the cassette is automatically opened and the plate withdrawn therefrom. The withdrawal operation is performed under dark conditions which prevent exposure of the image-bearing plate to ambient light which would degrade the quality of the latent image thereon. Thus, the cassette, the automated cassette opening and closing devices, and associated plate insertion and withdrawal devices are important components of the xerographic processing system which serve to faithfully reproduce the information pattern received by the xerographic plate during the external exposure operation.

In the presently preferred form of the invention, the charging unit also includes conditioning means to eliminate the phenomenon of fatigue normally associated with the exposure of xerographic plates to high energy penetrating radiation, such as X-rays. In general, the xerographic plate is heated to an elevated temperature and maintained at that state for a sufficient period of time to "relax" the xerographic plate whereby the adverse effects of fatigue are wholly or largely eliminated. The charging unit also includes a magazine for the storage of a plurality of conditioned xerographic plates, means to advance a plate to be conditioned from an entrance zone through the conditioning means to the magazine, and means to remove a conditioned xerographic plate from the magazine and to transport said plate to the charging means.

Optionally, the charging unit includes means to hold a storage box having a plurality of exposed and cleaned xerographic plates therein, and means to repeatedly withdraw a single xerographic plate therefrom and to transport the withdrawn xerographic plate to the conditioning means. The printer is also adapted to hold the aforementioned storage box, but in such a way that the storage box receives each of a plurality of cleaned xerographic plates from the cleaning means. After the desired number of cleaned plates have been inserted therein, the storage box is manually transported to the charging unit whereby the xerographic processing cycle is repeated.

BRIEF DESCRIPTION OF THE DRAWINGS

The nature of the invention will be more easily understood when it is considered in conjunction with the accompanying drawings wherein:

FIG. 1 is a plan view of a xerographic plate suited for transportation through the automated xerographic processing system of the present invention;

FIG. 2 is a side elevation of the xerographic plate of FIG. 1;

FIG. 3 is a fragmentary perspective view of the lower right-hand corner of the xerographic plate of FIG. 1;

FIG. 4 is a perspective view of a storage box suitable for transporting a plurality of xerographic plates therein from the printer unit to the charger unit of the xerographic processing system of the present invention;

FIG. 5 is a side view of the storage box of FIG. 4 showing, in partial cut-away, the retainer clip which serves to maintain the xerographic plates within the storage box until automatic removal by the xerographic plates within the storage box until automatic removal by the xerographic processing system;

FIG. 6 is a fragmentary bottom view of the clip at the lower right-hand corner of the storage box of FIG. 4;

FIG. 7 is a perspective view of the retainer clip used in the storage box of FIGS. 4 and 5;

FIG. 8 is a top plan view of a cassette suitable for use with the xerographic processing system of the present invention, this Figure showing in partial cut-away one latch member and the guide members associated with the proper positioning of the xerographic plate within the cassette;

FIG. 9 is a front elevational view of the cassette of FIG. 8 showing the cassette in a partially open condition ready for the insertion of a xerographic plate therein;

FIG. 10 is a side elevation of the cassette of FIG. 8 in its partially opened position;

FIG. 11 is a bottom fragmentary view of a portion of an optional top cover for the cassette of FIG. 8;

FIG. 12 is a cross-sectional view of the optional cover of FIG. 11 taken along line 12—12;

FIG. 14 is a longitudinal cross-section of the left-hand portion of the charging unit showing the plate storage magazine, the vacuum cleaning apparatus, the charging mechanism, and the cassette opening and holding means, with certain portions of the Figure being drawn in elevation;

FIG. 15 is a top plan view, partially in section, of that portion of the charging unit shown in FIG. 13, with the storage box removed;

FIG. 16 is a top plan view, partially in section, of that portion of the charging unit shown in FIG. 14, with the cassette removed;

FIG. 17 is a fragmentary top plan view, partially in section, of one side of the primary plate advancing mechanism, as viewed in the lower right-hand portion of FIG. 15, showing the mechanism's plurality of positions;

FIG. 18 is a fragmentary side-sectional view of the mechanism shown in FIG. 17 taken along line 18—18.

FIG. 19 is a fragmentary side elevation, partially in section, of the cassette holding and opening means associated with the charging unit;

FIG. 20 is a fragmentary side elevation, partially in section, of the cassette holding and opening means of FIG. 19 showing the cassette in the open position;

FIG. 21 is a fragmentary front view of the right-hand side of the cassette holding and opening means of FIG. 19 taken along line 21—21;

FIG. 22 is a longitudinal cross-section of the left-hand portion of the printing unit showing the inverted cassette opening and holding means, the xerographic plate withdrawal mechanisms, the development means, the pre-transfer corotron, and a portion of the support material transport means, with certain portions of the Figure being drawn in elevation;

FIG. 23 is a longitudinal cross-section of the right-hand portion of the printing unit showing the remainder of the support material transport means, the powder image transfer means, the fusing means, the plate cleaning means, and the inverted storage box holding means, with certain portions of the Figure being drawn in elevation;

FIG. 24 is a top plan view, partially in section, of that portion of the printing unit shown in FIG. 22;

FIG. 27 is a schematic view of the automated xerographic processing system indicating the interrelationships between the charging unit, the external exposure station and the printing unit.

Referring to FIGS. 1–3, there is seen a xerographic plate 10 adapted for transportation through the automated, flat-plate xerographic processing system of the present invention. Plate 10 has a conductive backing member 12 having coated on a portion of one surface thereof a photoconductive insulating coating 14, such as vitreous selenium. Each plate is provided for two side rails 16 integrally secured thereto and so constructed as to position the xerographic plate with reference to the several mechanisms, hereinafter to be described, with which it cooperates as it is transported through the automated xerographic processing system. As shown, each side rail 16 is secured to at least a portion of lower surface 18 of backing member 12. The side rail can be secured by adhesive bonding or through the use of a plurality of flat head screws (not shown). Downwardly stepped portions 20 and 22 of each side rail 16 define a foot 24 adapted to slide into a corresponding channel 60 in the cassette. Downwardly stepped surfaces 20 are adapted to cooperate with beveled portion 68 in the cassette, and the wall portions extending towards the rear of the cassette from beveled portion 68, so as to properly position the xerographic plate therein upon insertion by the automated plate advancing means. That portion 26 of each side rail adjacent the edge 12' of backing member 12 cooperates with a downwardly extending member 90 in the top cover of the cassette to assist in the rigid support of the xerographic plate when the plate-holding cassette is outside the automated processing units. The notches are positioned in the side rails so that a symmetrical arrangement with respect to the entire xerographic plate is obtained whereby, after manual manipulation of the plate outside the processing system, such as, for example, during examination of the plate to detect defects in the photoconductive layer, the plate can be inserted into the charger unit or the cassette with either the leading edge 30 or the trailing edge 32 forward. In either event, the plate will be inserted with the side rails in the depending position, i.e., as shown in FIG. 2. As shown, photoconductive layer 14 is on the top side of backing member 12. However, if desired, the photoconductive layer can be on the underneath side where the lower portion of side rails 16 would serve to form a recessed area protecting the photoconductive layer from inadvertent damage. This configuration would also protect a xerographic powder image thereon from accidental smearing during transit of the plate from the development mechanism to the image transfer mechanism. The photoconductive layer 14 does not completely cover the exposed surface of backing member 12 so that plate, for example, can be manually handled during visual examination thereof, automatically handled during transit of the plate through the processing system, and mechanisms can be positioned thereagainst, such as in the developer mechanism, without adversely affecting the xerographic processing properties of the photoconductive layer.

Figure 13:
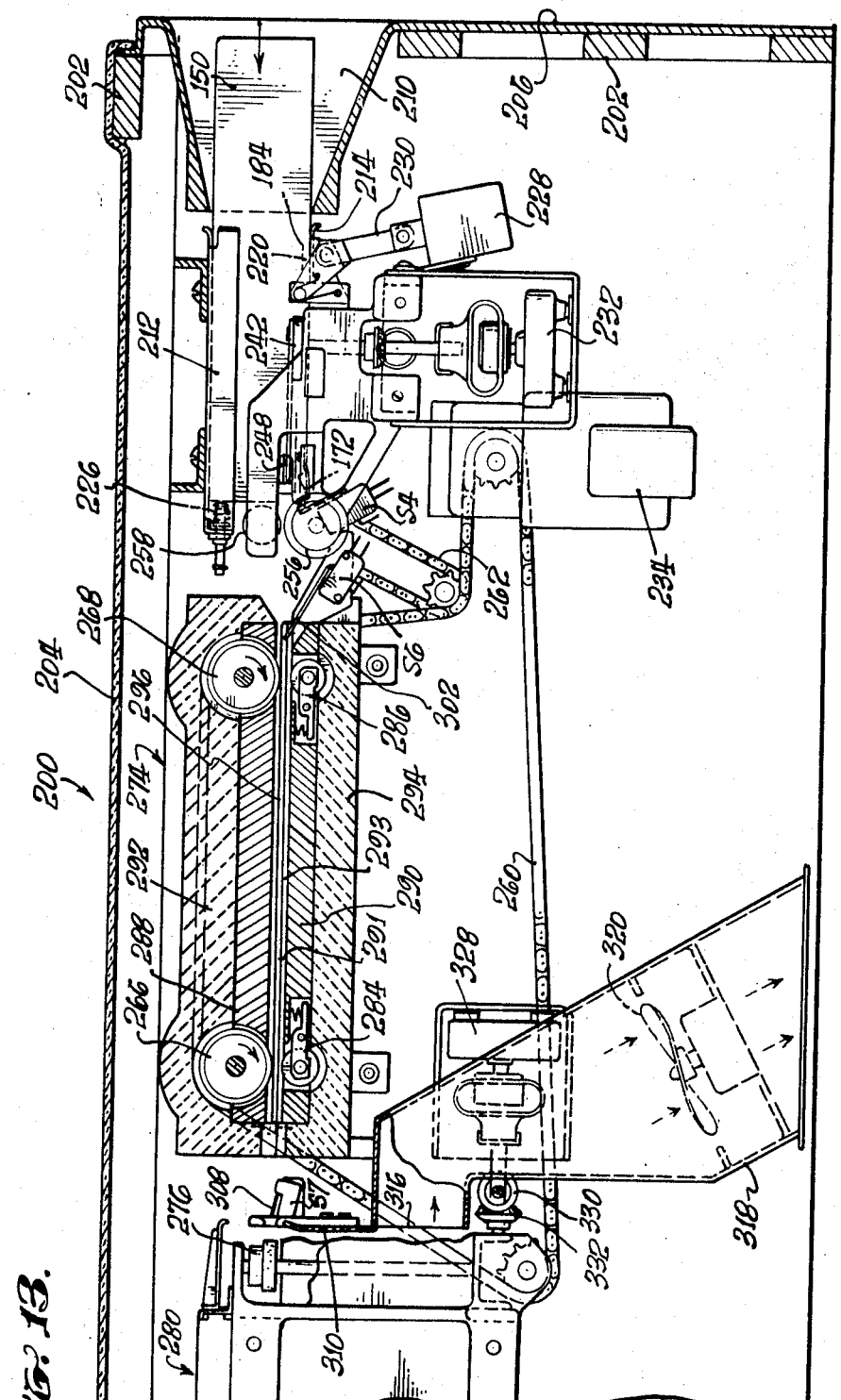
FIG. 13 is a longitudinal cross-section of the right-hand portion of the charging unit showing the storage box holding means, the xerographic plate withdrawal means, the conditioner means and the cooling assembly associated with the plate storage magazine, with certain portions of the Figure being drawn in elevation.

Magnetic members 34 are appropriately positioned within side rails 16 and cooperate with sensing devices in the processing system to indicate the position of a xerographic plate therewithin.

Optionally, thin black lacquer layer 36 can be coated on the non-photoconductive coated side of the xerographic plate to increase the absorptivity of the plate 10, should the plate be exposed to infra-red radiation during thermal conditioning thereof, as will be described hereinafter.

Referring to FIGS. 4 and 5, there is seen a storage box utilized for the manual transportation of a plurality of xerographic plates from the printer unit, described above, to the charger unit, also described above. Storage box 150 has a top wall 152, rear wall 154, side walls 156, front wall 158 and bottom wall 160. Adjacent the lower portion of front wall 158 is a slot 162 through which the xerographic plates are inserted into the storage box and withdrawn therefrom. Front wall portions 164 and 166 adjacent slot 162 are appropriately beveled to eliminate sharp corners which might interfere with the proper insertion of the xerographic plate into the storage box. Side walls 156 each have a U-shaped notch 168 communicating with slot 162. It is through U-shaped notches 168 that xerographic plate advancing means extend during the insertion and/or withdrawal of the xerographic plate.

Adjacent each lower front corner 170 is a retaining clip 172, as can best be seen in FIGS. 6 and 7. Clip 172 has an upper flat portion 174 through which holes 176 are drilled so the clip can be attached to bottom wall 160. In between upper flat portion 174 and upwardly depending front portion 178 is an intermediate flat portion 180 having a portion 182 turned back upon itself such that the width of upper depending member 178 is less than widest dimension of flat portion 180. A finger in the plate insertion and withdrawal means rides against turned-back portion 182 causing the retaining clip 172 to be depressed downwardly. This completely opens slot 172 whereby a xerographic plate can be inserted into, or withdrawn from, the storage box.

Rectangular notches 184 are positioned in the top and bottom walls of the storage box and cooperate with external locking means to hold the storage box in place, in the charger and printer units, during xerographic plate insertion and withdrawal. When using the xerographic plates of FIGS. 1–3 where the photoconductive surface is on the upper side of the xerographic plate, members 186, secured to the inside of the top wall, protect the photoconductive surface of the uppermost plate from slamming against interior surface 188 of top wall 152 should the storage box be inverted, either intentionally or accidentally. If the top cover is not sufficiently thick to enable the desired notch 184 depth, the notch can be partially cut into member 186 (as shown).

Referring to FIGS. 8–10, there is seen a cassette 40 into which the xerographic plate shown in FIG. 1–3 is inserted. Cassette 40 has a base 42 and a top cover 44 hinged together at the rear by hinges 46 which permit the opening and closing of the top cover so as to permit insertion and withdrawal of the xerographic plate. Hinges 46 are of conventional structure and design such that further description thereof is deemed unnecessary. Base 42 has a flat bottom wall 48, a front side wall 50, side walls 52 and a rear wall 54. Symmetrically positioned with respect to base 42 and extending above the vertical plane of the front, rear and side walls is a surface 56 adapted to support the lower surface of a xerographic plate inserted into the cassette. Adjacent each side of raised support surface 56 are innermost channels 58 separated from outermost channels 60 by ridges 62. Ridges 62 and the front portion of surface 56 are slightly beveled, as at 62' and 56', to reduce the possibility of a plate jamming as it is inserted into the cassette. Along the outside edge of each outermost channel 60 is an L- or U-shaped support rail 64. Notches 66 in front wall 50, beveled portions 56' and 62' and angled portion 68 at the front of support surface 56 adjacent innermost channels 58 serve to properly position the xerographic plate as it is inserted into cassette 40 by plate advancing means, to be described hereinafter. Ridges 62 cooperate with the flat portions on the bottom side of the side rails to support, in conjunction with surface 56, the xerographic plate in its proper position in the cassette when the base member is positioned below the top cover (i.e., as shown). Support rails 64 do not extend completely from the rear wall of base 42 to the front wall. Rather they terminate at a point which exposes the notch on each side rail adjacent the trailing edge of the xerographic plate so plate advancing means can cooperate therewith for appropriate plate movement. Around the inside parameter of base 42, as defined in part by walls 50, 52 and 54, there is a groove 72 adapted to cooperate with a tongue 88 on top cover 44 which, when properly closed and seated together, define a light-tight environment adapted to prevent exposure of a xerographic plate therein to ambient electromagnetic radiation. Interior wall portions are also provided to further define groove 72 into which tongue 88 is seated to maintain the desired dark environment.

As will be described hereinafter, the cassette will be substantially in the position as shown in FIGS. 9 and 10 when it is inserted into the charging unit, i.e., when the uniformly charged plate is automatically inserted into the cassette. After exposure, to insert the cassette into the printing unit, it is necessary that the cassette be inverted whereby base member 42 will be on top. In this position, support rail 64 serves its primary function of maintaining the plate in proper vertical alignment with the plate path associated with the automated plate advancing mechanism. When inverted, the upper portions of the side rails will seat against the horizontally extending portions of support rail 64 remote from bottom wall 48 and will be supported thereby. The plate advancing means will then automatically cooperate with the notches in the side rails to withdraw the plate from the cassette and transport it toward the developing unit.

Top cover 44 has front wall 82, top wall 83, side walls 84 and rear wall 86. Depending downwardly from walls 82, 84 and 86, is a tongue 88 adapted to cooperate with groove 72 in base 42 to provide, as indicated above, a light-tight environment when the top cover 44 is in the closed position. To permit proper alignment between tongue 88 and groove 72, and to provide flush surfaces defined by the outside walls of the base and the top cover when the cassette is in the closed position, tongue 88 is recessed slightly from walls 82, 84 and 86 toward the interior of the top cover. The width of groove 72 adjacent the rear wall 54 of base 42 and/or the thickness of that portion of tongue 88 adjacent back wall 86 of top cover 44 are so chosen as to permit the opening of the cassette, and particularly the top cover thereof, about hinges 46. Extending from the interior side of front wall 82 to the interior side of rear wall 86 are downwardly depending ridges 90 adapted to seat against the upper portion of the side rails on the xerographic plate and that portion of the upper surface of the conductive backing member adjacent thereto. An interference fit results which assists in securely maintaining the xerographic plate in the desired position within the cassette, especially when the plate-holding cassette is in the closed condition outside the automated processing units.

Front wall 82 of top cover 44 and that portion of tongue 88 depending therefrom has two notches 92 positioned therein in front of latch members 94 situated in front wall 80 of support surface 56. Each latch, as shown in the cutaway portion, has a chamber 96 in which the latch mechanisms reside. Secured to back wall 98 of chamber 96 is a pin 100 about which there is wound a coiled spring member 102. Spring 102 normally urges movable latch member 104 toward front wall 80 of support surface 56. In its fully extended position fingers 106 on member 104 seat against interior grooves 107 in front wall 82, as can best be seen in FIG. 10. When in the fully extended position, the meshing of fingers 106 and interior grooves 107 maintain the top cover in a locked position and prevent the cassette from being opened. Fingers on cassette opening means when inserted through notches 92 depress movable latch members 104 from their forward position and permit top cover 44 to be rotated into the open position, whereby a xerographic plate can be inserted therein or, if a plate is already therein, it can be withdrawn therefrom.

Side walls 52 in base 42 and side walls 84 in top cover 44 are notched to define channels 108 when the cassette is in the closed position. Channels 108 are adapted to cooperate with cassette opening means whereby the cassette will be properly positioned with respect thereto and opened to insert and/or remove a xerographic plate therefrom. Such mechanisms and the manner in which they cooperate with the cassette inserted therein are described in greater detail further on in this specification.

As can best be seen in FIG. 10, hinge 46 has a space 111 between cooperating surfaces 113 and 115 which defines the angular opening through which top cover 44 can be rotated about pin 116. The spacing can be selected to provide the degree of angular opening desired.

The flat bottom portion 110 of each guide rail 64 is interrupted in the central portion thereof by upwardly extending boss 112 which has a rectangular notch 114 cut into the bottom portion thereof through bottom wall 48. As the cassette is inserted into either automated processing unit, cooperating edges of the cassette opening means slide into channels 108. Continued insertion of the cassette causes the top cover to come in contact with cassette opening means, and the latch members 104 with latch opening means, whereby further continued movement will cause opening of the top cover. At or near the end of the insertion movement, external means cooperate with notches 114 to lock the cassette in the proper position for plate insertion or withdrawal. Further description of the opening and locking operation will be set forth hereinafter.

Referring to FIGS. 11 and 12, there is seen a portion of the operative portion of the inside of an optional top cover 120 suitable for use with base 42 described in FIGS. 8–10. Interior of downwardly depending ridges 90 but closely spaced thereto are channel-defining members 122. Interior to front wall 82 and rear wall 86 and also closely spaced thereto are further channel-defining members 124. Members 122 and ridges 90, and members 124 and walls 82 and 86, define a spline channel 126 therebetween. It is the function of this channel to permit the positioning of a membrane 127, such as cloth or plastic film, over the lower surfaces of members 122 and 124 for the purpose of preventing ionic degradation during xeroradiographic imaging. The membrane is stretched over the lower surfaces of members 122 and 124 and secured thereto by positioning a spline 129 over the membrane above spline channel 126 and then forcing the spline and the underlining membrane into the spline channel.

Notches 128 are cut into members 122 at various positions along the length thereof. From notches 128 to channels 130 on the opposite side of ridge 90 from members 122, holes 132 are drilled to permit the expulsion of air from the air chamber defined by interior top wall portion 134 of top 120, members 122 and 124, and the membrane 127 securely positioned thereto. Since, in the xerographic processing system herein described, it is expected that the latent electrostatic image-bearing plate will be manually handled after exposure, but before image development, it can also be expected that pressure will be exerted upon the top cover 44 of the cassette. Such pressure can result, for example, during positioning of that portion of the patient's body undergoing examination or by a technician during manual transportation of the cassette to and from the exposure station. This downward pressure will cause a ballooning of the stretched membrane which may function to disturb the latent electrostatic image should direct contact result. This ballooning can be prevented by permitting the trapped air above the membrane to be expelled from the air chamber when compressive pressure is applied to the top cover. This is achieved by providing holes 132 through which air can escape from above the membrane when pressure is applied to the top cover, as described above.

As a further optional item, there is provided a notch 136 under the interior portions of members 122 into which there can be inserted a filter 138 adapted to modify the imaging radiation before it reaches the charged xerographic plate. When in position the filter should not cover the entrance port on the near side of holes 132 so as to prevent the expulsion of air should pressure be applied to the top wall of cover 44.

A plurality of members 140 can be provided for the purpose of locating the position in which ridges 90 are to be secured to the top cover of the cassette.

After a xerographic plate has been inserted into the cassette by means described hereinafter, the cassette is automatically released from its holding means. In this operation, the cassette jumps back a short distance during which the top cover of the cassette is automatically lowered into the closed and locked position. Since the inserted xerographic plate, before the cassette is released, is merely supported by the contacting portions of base member 42, it was found that the inertia of the plate limited its movement, during the cassette release operation, to a distance less than the distance moved by the cassette. This resulted in the trailing edge of the plate extending into the opening between the top cover and the base member thereby blocking the movement of the top cover toward the closed and locked position. This has been overcome by positioning a material having a sufficiently high coefficient of friction, such as sponge rubber, in each of channels 58. The intimate contact of the underside of the xerographic plate with the slip-retarding material serves to maintain the xerographic plate in its inserted position as the cassette is automatically released. The plate no longer blocks the movement of the top cover whereby the top cover can properly seat and lock with the base member. The cassette, with the xerographic plate therein, will, accordingly, be in the desired condition, suitable for manual transportation outside of the automated processing units.

The base member and the top cover of the cassette can be constructed from organic resinous materials, such as the polycarbonate "Lexan" and the phenylene oxide related "-Noryl," both resins being products of the General Electric Company. In general, the construction materials should be capable of being molded in thin sections to provide a strong, abrasion and impact resistant, rigid article suitable for the protection of the photoconductive layer on a xerographic plate inserted in the finished cassette. The resinous material must be opaque or must accept sufficient coloring material to be opaque to electromagnetic radiation, other than X-rays. If the resinous material is made opaque by the addition thereto of coloring material, the resultant mixture should be sufficiently homogenous so as not to present differential absorbing areas through which exposure to imaging radiation is made. Additionally, the material must be of limited absorptivity so that imaging radiation is not undesirably absorbed in the top cover. Finally, since the cassette is expected to be used in a medical diagnostic environment, it should be sufficiently chemically inert to withstand chemical sterilization, such as with isopropyl alcohol.

In the machine embodiments described in the attached drawings, the charging unit comprises a light-tight, box-like structure containing means to receive and hold the storage box of FIGS. 4 and 5, means to successively withdraw a xerographic plate therefrom, means to transport the xerographic plate from the storage box holding means to conditioning means wherein the residual image normally associated with the exposure of xerographic plates to high energy penetrating radiation, such as X-rays, is eliminated, means to insert each xerographic plate into the conditioning means and to hold the plate therein for a predetermined period of time, means to expel the conditioned xerographic plate from the conditioning means after the predetermined time period, a plate storage magazine, means to transport a conditioned xerographic plate from the conditioning means to the storage magazine, means to withdraw the xerographic plate from the storage magazine, vacuum cleaning means adapted to remove extraneous material from the photoconductive surface of the xerographic plate, means to deposit a uniform electrostatic charge on the cleaned photoconductive surface, means to receive, open and hold the cassette of FIGS. 8–10, means to transport the xerographic plate past the vacuum cleaning means and the charging means to the cassette holding station, and means to insert the uniformly charged xerographic plate into the opened cassette. Upon insertion of the plate, the cassette is automatically released whereby the top cover of the cassette is lowered into the closed position thereby securing the charged xerographic plate in a light-tight environment. Appropriate indication is made on the unit's control console to alert the technician that the cassette, with a charged xerographic plate therein, is ready for transportation to an external exposure station.

Referring to FIGS. 13–16, there is seen a charging unit 200 having internal structural members 202, external top cover 204, external right-hand side cover 206 and external left-hand side cover 208. In right-hand side cover 206 there is an entrance port 210 through which storage box 150 is inserted with the slotted opening 162 forward and in the down position. The storage box is guided into the proper position by upper guide rails 212 and lower guide rails 214. As can be seen in greater detail in FIGS. 17 and 18, the insertion of storage box 150 into the charging unit causes each retaining clip 172 to come in contact with cam means 216 adapted to ride over turned-back portion 182 (for example, see FIG. 7). Clips 172 are pivoted downwardly whereby slot 162 is completely opened and a xerographic plate can be withdrawn therethrough. As the storage box is inserted into the charging unit, it rides over lower guide members 214 adjacent opposite ends of shaft 218 which has latch members 220 extending through slots 222 in guide members 214. A magnetic reed switch S1 is positioned adjacent the side wall of the storage box to detect the presence of magnet 34 in the adjacent side rail 16 of a xerographic plate 10 therein. Additionally, switch S2 and thermoswitch S3 are positioned adjacent the uppermost plate storage position in the plate storage magazine and adjacent the conditioning means, respectively. If there is a xerographic plate within the storage box (as determined by magnetic reed switch S1), the latch members 220 are rotated into position within notches 184 in the bottom wall of the storage box by the action of spring 224. Simultaneously during the storage box insertion operation, the front wall 158 of the storage box comes into contact with spring actuated plunger 226 which is compressed, as can best be seen in FIG. 18. If, however, the storage box is empty, as determined by magnetic reed switch S1, solenoid 228 will be actuated causing latch members 220 to be pulled downwardly by linkage through arm 230. When latch members 220 are moved downwardly, the storage box will be urged outwardly from its most advanced position by the action of spring loaded plunger 226, and a reload signal will flash on the instrument panel.

When there is a position in the plate storage magazine for the insertion of a conditioned xerographic plate (as determined by the release of switch S2), the conditioning means is at the proper temperature (as determined by thermoswitch S3), and there is a xerographic plate within the storage box, switch S4, now in contact with the front edge of the latched storage box, will be actuated and will thereby energize motor 232 associated with the means to withdraw the xerographic plate from the storage box and motor 234 associated with the drive mechanisms for inserting the xerographic plate into the conditioning means and the withdrawal of the conditioned xerographic plate therefrom.

As can be seen in greater detail in FIGS. 17 and 18, the means for withdrawing a xerographic plate from the storage box comprises motor 232 connected through bevel gears 236 and 238 and shaft 240 to a pair of rotary wheels 242 on opposite sides of shaft 244. Connected to each wheel 242 about the periphery thereof is pawl 246 having a finger 248 curved inwardly towards storage box 150. Attached to support member 250 and a point on pawl 246 intermediate finger 248 and the connection of pawl 246 about the periphery of rotary wheel 242 is a lever arm 252. In the position as shown (i.e., position A), the tip of finger 248 is inserted through the U-shaped notch 168 in the side wall of the storage box and into notch 28 in the side rail of the bottommost xerographic plate. As wheel 242 rotates to position B, fingers 248 contact front edges 254 of notches 28 and urge the xerographic plate out of the storage box and into contact with drive rollers 256 and pressure rollers 258. As wheel 242 rotates past position B where the pawl is in its most advanced position with the xerographic plate in contact with the drive and pressure rollers, the pawl is released from contact with notch 28 and assumes the position shown, for example, as position C. Cam-operated switch S5 deactuates motor 232 after one revolution of shaft 244 whereby the plate advancing mechanism is positioned, as can best be seen in FIG. 15, for withdrawal of the next xerographic plate upon appropriate automatic command.

As previously indicated, motor 232 is actuated simultaneously with motor 234 by switch S4. Motor 234, by means of drive chains 260 and 262, drives driving wheels 256 on opposite sides of shaft 264; drive wheels 266 and 268 on opposite sides of shafts 270 and 272, respectively, in conditioning means 274; and drive wheels 276 and 278 adjacent the entrance to plate storage magazine 280. On the opposite side of xerographic plate 10 from drive wheels 256 are downwardly urged pressure rollers 258 supported by pressure roller arm 282. In conditioning means 274, upwardly urged idle rollers 284 and 286 are positioned opposite corresponding drive wheels 266 and 268, respectively, but beneath the path of travel of the xerographic plates passing therethrough.

Conditioning means 274 comprises upper heating block 288 and lower heating block 290 encased by upper insulator cover 292 and lower insulator cover 294, respectively, thereby defining a path 296 for xerographic plate passage therethrough. Upper heating block 288 has three heating elements 298 therein and lower heating block 290 has five heating elements (not shown) therein. It should be understood, however, that the number of heating elements can be varied as desired, consistent, of course, with the capability of maintaining the proper temperature within the conditioning means. Lower heating block 290 has interior grooves 291 adapted to receive the upper portion of foot 24 on side rail 16 of xerographic plate 10 adjacent surface 70. Lower heating block 290 also has lower, exterior grooves 293 adapted to receive the lower portion of foot 24 on side rail 16. It is into grooves 293 that upwardly urged idle rollers 284 and 286 extend, as can best be seen in FIG. 13. Grooves 291 and 293 are adapted to receive the side rail 16 of xerographic plate 10 thereby assisting in guiding the xerographic plate through conditioning means 274. As a xerographic plate is inserted into conditioning means 274 by the action of drive rollers 256, the plate comes into contact and depresses arm 302 on switch S6. As insertion is continued, the plate comes into contact with drive wheels 268 and eventually drive wheels 266. As the trailing edge of the plate passes into the conditioning means, arm 302 on switch S6 is released. This deactuates motor 234 and leaves the xerographic plate within conditioning means 274 for a predetermined period of time as set on timer means (not shown) also actuated by the release of arm 302.

As conditioning means 274 is presently designed, there are five temperature control switches (not shown) associated therewith. The first switch determines the minimum temperature suitable for conditioning. If the conditioning means is below the preset temperature, a xerographic plate cannot be withdrawn from the storage box and inserted into the conditioner. The second switch is set at the maximum temperature for safe operation of the conditioner. If this temperature is reached, the second switch will terminate operation of this section which will be indicated on the control panel. This switch is manually resetable whereby resumption of xerographic processing can be achieved after the cause for exceeding the maximum temperature has been determined and corrected. The third switch is a fail-safe switch set at a temperature above the predetermined temperature established for the second switch. It is used solely as a back-up means in case the second switch should fail. The fourth and fifth temperature control switches are the cycling switches adapted to maintain the proper conditioning temperature within the conditioning means. One switch controls the three heating elements 298 within the upper heating block 288 whereas the other switch controls the five heating elements 300 within the lower heating block 290. When the conditioning means reaches the predetermined lower temperature on the cycling switches, the heating elements are energized until such time as the conditioning means reaches the predetermined upper temperature on the cycling switches. As that time, the heating elements are de-energized and remain in that condition until the lower temperature on the cycling switches is reached once again. The cycle is then repeated whereby the conditioning means is maintained at a proper conditioning temperature.

The conditioning conducted in conditioning means 274 can be, for example, in accordance with the methods described in Vyverberg et al. U.S. Pat. No. 2,863,767.

After the predetermined period of time for conditioning as determined by the timer means, motor 234 is actuated such that drive wheels 266 and 268 cause the xerographic plate to be withdrawn from the conditioning means and into contact with drive rollers 276 and 278 adjacent the entrance to the plate storage magazine 280. Drive wheel 278 is connected along its vertically extending shaft 304 by a universal joint 306 whereby pressure is maintained in an inward direction whereby a xerographic plate passing between drive rollers 276 and 278 will be maintained in contact with both rollers. As a xerographic plate is withdrawn from conditioning means 274, it comes into contact with switch S7 and, as the trailing edge passes over switch S7, it releases arm 308 which deactuates motor 234.

Plate storage magazine 280 has entrance wall 310 over which the xerographic plate passes as it is inserted into the conditioning means by drive rollers 276 and 278. Opposite wall 310 is louvered wall 312 having louvers 314 disposed adjacent the bottom thereof. Adjacent the bottom of wall 310, there is an opening 316 connected to shroud 318 which has a cooling fan 320 therein. Cooling fan 320 operates to draw ambient air over the stacked xerographic plates held in magazine 280. In this manner, the conditioned xerographic plates are cooled to a temperature suitable for xerographic processing.

Magazine 280 includes elevator 322 having a pair of vertically positioned drive chains 324. Each pair of drive chains has a pair of tiltable plate carriers 326 positioned 180° apart on the drive chains. Each plate carrier 326 has a vertically extending lip 327 attached to the drive chains, a horizontally extending lip 329 hinged to lip 327, and a spring 331 which urges plate carriers 326 into the normal position wherein lip 327 is vertical and lip 329 is horizontal. As a xerographic plate is inserted into magazine 280, it is supported by a pair of plate carriers 326 attached to the opposed drive chains. Motor 328 is energized by the release of arm 308 on switch S7, simultaneous with the deactuation of motor 234. Motor 328 is connected to drive chains 324 through bevel gears 330 and 332 and shaft 334 and so operates to move plate carriers 326 with the xerographic plate thereon in a downward direction. As the plate carriers reach the bottom of the storage magazine, or a xerographic plate held therein, they deposit the supported xerographic plate and, with continued movement of the drive chains, tilt to the retracted position whereby movement passed previously stored plates can be achieved. When the drive chains have rotated slightly less than 180°, the plate carriers pass switch S11 which deactuates motor 327. Brake means (not shown) associated with motor 328 cause the plate carriers to be stopped in the proper position whereby the now uppermost plate carriers are ready to receive a freshly conditioned xerographic plate when it is subsequently withdrawn from the conditioning means. The plate carriers which, in the past half cycle of movement, have carried a xerographic plate to the bottom of the storage magazine or to the top of the stack of plates already therein, return to their normal, unretracted condition, under urging of springs 331, as they pass the bottom of the storage magazine and start their upward movement on the side of the drive chains opposite from the stored xerographic plates.

Referring to FIGS. 19–21, there is seen cassette holding and opening means 400 which forms part of charging unit 200. On each side of the cassette as it is inserted into the charging unit, means 400 includes top cassette guide means 402 and bottom guide means 404. Each guide means 402 is flared upwardly at 406 and each guide means 404 is flared downwardly at 408 to thereby define an opening 409, opposite the internal end of port 340, adapted to receive the cassette and assist in the channeling thereof into the proper holding and opening position. Each guide member 404 has a flat portion 410 upon which cassette base member 42 is supported as it is inserted into the opening means. Attached to the end of flat portion 410 most adjacent charging means 348 is a U-shaped member 412 having a finger 414 extending back toward the direction from which the cassette will be inserted (i.e., toward port 340). Fingers 414, as can best be seen in FIG. 19, are positioned to extend through notches 92 in front wall 82 of cassette top cover 44 and depress movable latch members 104 to thereby release the top cover from the locked position such that it is in condition for appropriate rotational movement about hinges 46. Pivotally mounted to each upper guide member 402 about point 416 is pivot arm 418, the upper portion of which is pivotally mounted at point 420 to arm 422 supported by U-shaped bracket 424. Also mounted on arm 422 is spring anchor 426. The upper ends of pivot arm 418 and spring anchor 426 are connected by spring 428 which normally urges arm 418 into the position as shown in FIG. 19. The opening mechanisms on the opposite sides of the cassette are linked to each other through shafts 430 and 432 mounted as pivotal points 416 and 420, respectively.

Each lower guide member 404 has upwardly extending portion 434 terminating in an inwardly extending rib 436. Each upper guide member 402 has a corresponding downwardly extending portion 438 terminating in an inwardly extending upper rib 440 which sits on top of lower rib 436. Ribs 436 and 440, on each side of the cassette, are adapted to slide into the adjacent channels 108 in the side walls of the cassette upon the insertion thereof into the cassette opening means 400. Adjacent the end of each upper guide member 402 most closely adjacent charging means 348 there is a slightly rounded, downwardly extending portion 442 adapted to receive the rounded, upper edge between front wall 82 and top wall 83 of cassette top cover 44.

When the cassette is inserted into cassette opening means 400 and assumes the position shown in FIG. 19, fingers 414 depress movable latch members 104 whereby the cassette top cover 44 is no longer locked to base member 42. Simultaneously, the rounded, upper edge between front wall 82 and top wall 83 of the top cover seats against the slightly rounded, downwardly extending portion 442 on each upper guide member 402. Continued movement of the cassette in the direction as shown by the arrows in FIGS. 19 and 20 causes the rotation of top cover 44 into the position shown in FIG. 20 by action of pivot arm 418 pivoting about point 420. This continued insertion will bring notches 114 in the bottom wall of the cassette into alignment with latch members 444 which will be rotated into notches 114 through slots 446 in lower guide members 404 under the urging of spring members 448. If, however, a reed switch (not shown) indicates the presence of a xerographic plate in the cassette by sensing magnet 34 in side rail 16, solenoid 450 will be actuated thereby causing latch members 444 on opposite sides of shaft 445 to be displaced downwardly through linkage with arm 452. This will release the cassette from the locked position (shown in FIG. 20) whereby top cover 44 will be rotated downwardly under urging of spring 428. Simultaneously, the cassette will be ejected slightly to the left toward port 340.

An empty cassette, will remain in the open position, as shown in FIG. 20, until a xerographic plate is inserted therein by plate advancing mechanisms 382. At that time, a cam-operated switch (not shown) associated with the movement of plate advancing mechanisms 382 will cause solenoid 450 to be actuated whereby, as indicated above, latch members 444 will be withdrawn from notches 114, and top cover 44 will be rotated downwardly into the closed position and the cassette will be partially ejected under urging of loaded spring 428. Upper guide member 402 is itself guided in its downward movement by the curved, outwardly extending portions at the bottom of guide members 454 positioned on the outside thereof. Thus, during the cassette closing operation, the top cover will be guided into the proper position over base member 42 such that latch members 104 can be urged forward into the locked position. The cassette, with the xerographic plate held therein in a light-tight environment, is now in the proper condition for manual transportation through an external exposure station to the printing unit, to be described hereinafter, wherein the latent electrostatic image created in the exposure station will be developed into a corresponding reproduction thereof suitable for visual examination.

Adjacent the bottom wall 312 in magazine 280 and side walls 336 there is an opening 338 through which xerographic plates may be withdrawn. To withdraw a conditioned xerographic plate from the magazine, an empty cassette 40 is inserted through port 340 in side wall cover 208. As explained above with regard to FIGS. 19–21, the cassette if empty will be automatically opened and locked in the proper position upon insertion. At the same time that the empty cassette is latched into position, the front end thereof depresses switches S8 and S9. S8 indicates the presence of a cassette in the cassette holding means whereas switch S9 indicates that the cassette is in the most advanced, locked position. The latching of cassette 40 in this position actuates motor 342 associated with the plate advancing mechanisms 344 adjacent opening 338 in the lower wall of the plate storage magazine 280; motor 346 associated with means for transporting the xerographic plate past charging means 348; and cleaning means 366. Plate advancing mechanisms 344 are as described in FIG. 17 and operate in the same manner to withdraw the xerographic plate from the magazine. Fingers 248 cooperate with notches 28 in the side rails of the xerographic plate to advance a xerographic plate, resting on idle rollers 350 through opening 338 into contact with drive rollers 352 driven by motor 346 by means of drive chain 354. Drive rollers 356 are also drive by motor 346. Immediately above drive rollers 352 and 356 just above the path of xerographic plate travel, are pressure rollers 358 and 360, respectively, supported by support arms 362 and 364, respectively. As a xerographic plate is withdrawn from the storage magazine 280 by plate advancing mechanisms 344, it comes into sequential contact with drive rollers 352 and 356 which continue the transportation thereof beneath cleaning means 366 and charging means 348. As with the plate advancing mechanism described in FIGS. 15 and 17, plate advancing mechanisms 344 have a cam-operated switch (not shown) associated with shaft 368 which causes motor 342 to be deactuated after a single revolution of shaft 368 thereby leaving the plate advancing mechanism in the position as shown in FIG. 16 ready for the advancement of the next xerographic plate. Cleaning means 366, with its nozzle 368 adjacent the transverse path of the photoconductive surface of the xerographic plate, is connected to blower means 370 by conduit 372. It is adapted to create a vacuum adjacent the upper, photoconductive surface of the xerographic plate and thereby remove extraneous, unwanted material, such as dust, toner particles, etc. The xerographic plate then passes beneath charging means 348, such as either of the scorotrons shown in U.S. Pat. Nos. 2,777,957 and 2,778,946. Other corona discharge devices, such as those described in other corona charging patents assigned to Xerox Corporation, can be substituted for the corona discharge devices described in the aforementioned patents; however, the screened corona discharge devices of the aforementioned patents are preferred because of the uniformity of electrostatic charge which can be applied to the photoconductive surface of the xerographic plate. Uniform charging is achieved in accordance with conventional corona techniques, for example, as described in the aforementioned corona charging patents assigned to Xerox Corporation. During the charging operation, the conductive backing member of the xerographic plate comes into contact with wheels 374, supported by brackets 375 which support the plate and also assist in the proper spacing of the photoconductive surface in relationship to charging means 348. In addition, an exposed portion of conductive backing member 12 of xerographic plate 10 comes in contact with ground lead 376 which establishes the proper ground plane for xerographic charging.

As the leading edge of the xerographic plate passes charging means 348, it also passes switch S10 and depresses arm 378 thereon. As the xerographic plate is partially inserted into the cassette, held in the position shown in FIG. 20, by drive wheels 356, the trailing edge of the plate passes switch S10 and arm 378 is released. This deactuates motor 346 which had been driving drive wheels 352 and 356, motor 370 associated with cleaning means 366, and the power supply (not shown) associated with charging means 348. Additionally, the release of arm 378 actuates motor 380 associated with the mechanisms 382 for completing the insertion of the xerographic plate into the cassette. Plate advancing mechanisms 382 are as described in FIG. 17 with the exception that wheels 242 are caused to revolve in the opposite directions from those specified in FIG. 15. The plate advancing mechanisms are so positioned as to cause the tips of fingers 248 to contact the trailing edge of side rail 16 on each side of the xerographic plate whereby continued revolution of wheels 242 will cause the xerographic plate to be completely inserted into the cassette. As with the plate advancing mechanisms previously described, plate advancing mechanisms 382 have a cam-operated switch (not shown) associated therewith which causes motor 380 to be deactuated after a single revolution. Simultaneously, this cam-operated switch actuates solenoid 450 whereby latch means 444 are withdrawn from notches 114 in the bottom wall of the cassette. The cassette is partially ejected from the cassette holding means by the action of loaded spring 428 on the top cover of the cassette through linkage with upper guide member 402 and downwardly extending portion 442 thereon. The top cover of the cassette will be rotated into the closed position such that the xerographic plate therein will be maintained in a light-tight environment adapted to prevent exposure of the charged xerographic plate to ambient, actinic electromagnetic radiation such as might degrade image quality. In this manner, the cassette, with the xerographic plate therein, is readied for manual transportation through an external exposure station to the printing unit, to be described hereinafter, wherein the latent electrostatic image on the xerographic plate will be converted into a corresponding reproduction thereof suitable for visual examination.

Figure 25:
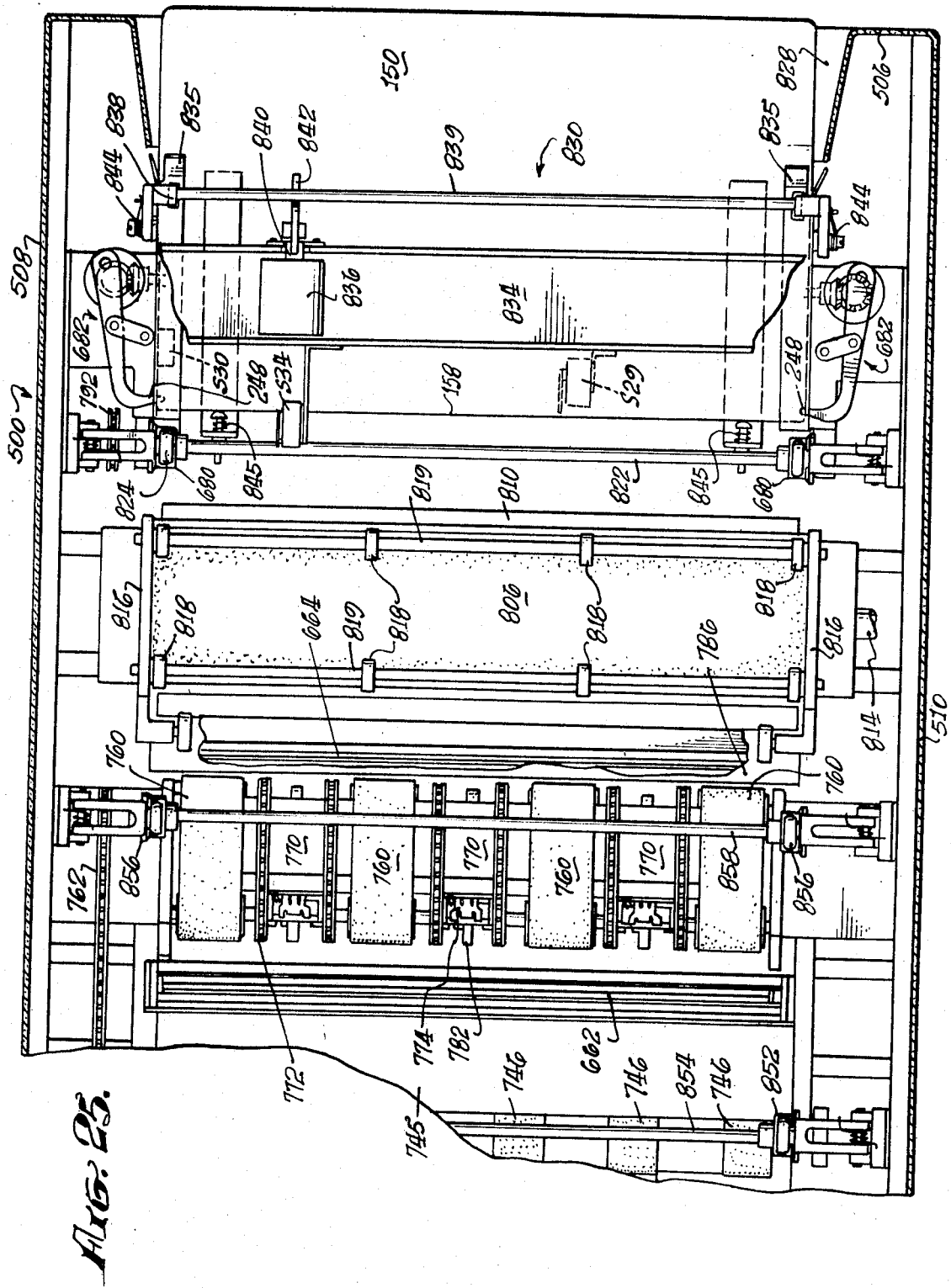
FIG. 25 is a top plan view, partially in section, of that portion of the printing unit shown in FIG. 23.
Figure 26:
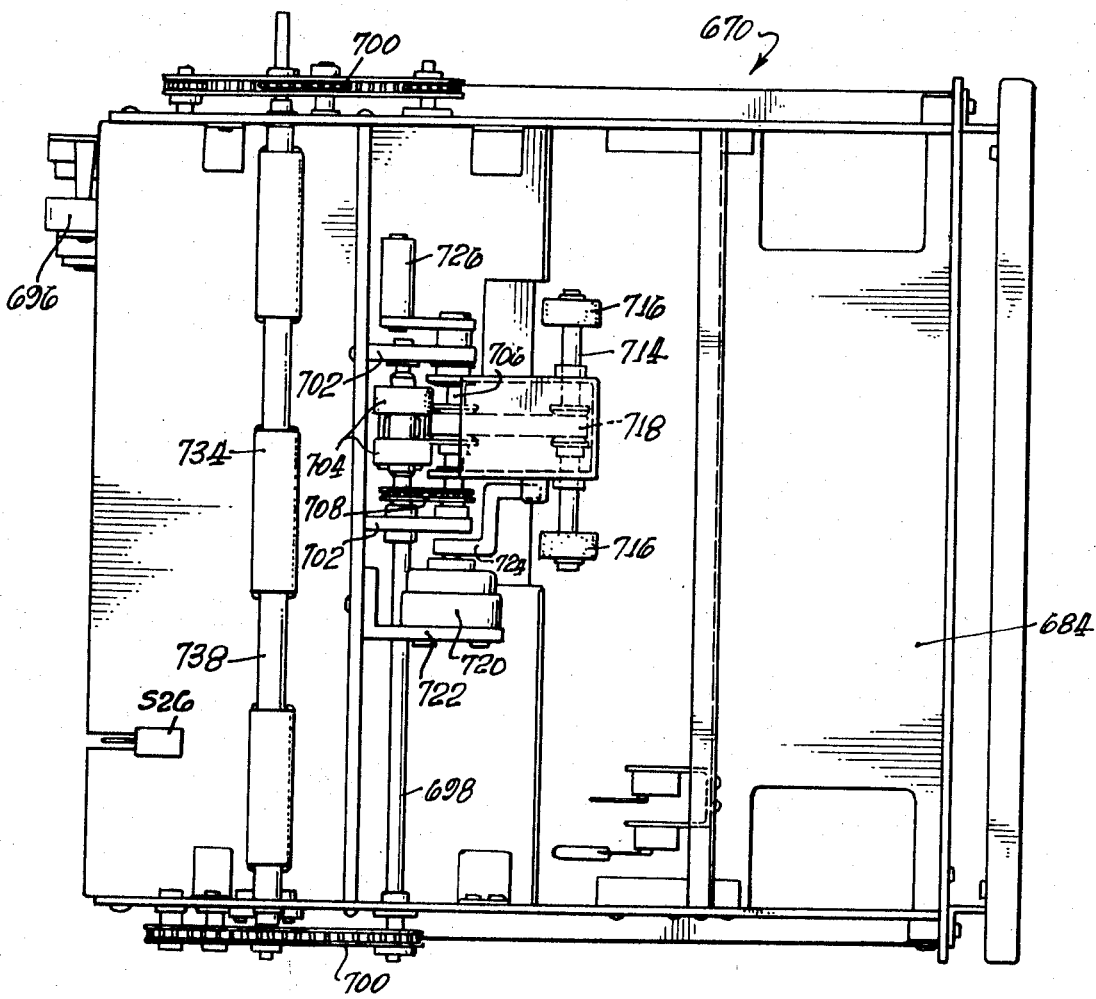
FIG. 26 is a top plan view of the support material feed mechanism taken along line 26—26 of FIG. 23.

In the embodiment described in FIGS. 22–26, the printing unit comprises a light-tight, box-like structure containing means to receive, open and hold the cassette of FIGS. 8–10, the cassette being inverted, upon insertion into the printing unit, from its position of use with respect to the charging unit, means to withdraw the latent electrostatic image-bearing xerographic plate therefrom, means for developing the latent electrostatic image on the xerographic plate including means to seat the development means against the xerographic plate to thereby define a leak-tight development chamber, means to transport the xerographic plate from the cassette to the development means, means to advance the xerographic plate from the development station with the powder image thereon after development, support material transport means including means to bring the support material into aligned contact with the surface of the xerographic plate having the powder image thereon, means to transfer the powder image from the xerographic plate to the support material, means to strip the support material with the powder image thereon from the xerographic plate, cleaning means to remove residual toner from the photoconductive surface of the xerographic plate, means to receive and hold the storage box of FIGS. 4 and 5, the storage box being inverted, upon insertion into the printing unit, from its position of use with respect to the charging unit, means to advance the xerographic plate, after the powder image has been transferred to the support material, past the cleaning means and into the storage box, means to fuse the powder image to the support material, means to transfer the powder image-bearing support material from the stripping zone to the fusing means, means to advance the fused image-bearing support material out of the fusing means and into a receiving tray whereby there is obtained a faithful, permanent reproduction of the imaging radiation which is suitable for visual examination.

When the complete complement of xerographic plates have been inserted into the storage box, the storage box is automatically released from its position in the printing unit and appropriate indication is made on the unit's control console to alert the technician that the storage box, with the xerographic plates therein, is ready for transportation to the appropriate position in the charging unit, whereby the cycle of xerographic processing can be repeated.

Referring to FIGS. 22–26, there is seen a printing unit 500 having base 502, external top cover 504, external right-hand side cover 506, rear wall cover 508, front wall cover 510 and external left-hand side cover 512. In left-hand side cover 512 there is an entrance port 514 through which cassette 40 is inserted after imaging exposure. As previously indicated, it is necessary to invert the cassette, relative to its position of use with respect to the charging unit, to insert it into the printing unit. This follows from the fact that the photoconductive layer is on the top side of the xerographic plate in the charging unit and passes under the charging means to thereby receive a uniform electrostatic charge whereas, in the printing unit, it is desirable to have the photoconductive surface on the underside of the plate for most effective utilization of the powder cloud development system, to be described hereinafter.

The printer unit, as described in FIGS. 22–26, has numerous components, such as the plate advancing mechanisms, which have the same structure as corresponding components in the charging units. Like elements of the corresponding components used in both the printing and charging units will be identified by like numerals, as previously utilized with regard to the charging unit of FIGS. 13–15, etc.

In its inverted position, the cassette is guided into the proper position by cassette holding and opening means 520. Means 520 is similar in structure to means 400, shown in FIGS. 14, 16 and 19–21, but is used in an inverted mode. On each side of the cassette as it is inserted into the printing unit, means 520 includes top cassette guide means 522 and bottom guide means 524. Each guide means 522 is flared upwardly at 406 and each guide means 522 is flared downwardly at 408 to thereby define an opening 409, opposite the internal end of port 514, adapted to receive the cassette and assist in the channeling thereof into the proper holding and opening position. Each guide member 524 has a flat portion upon which the top surface of cassette top cover 44 is supported as it is inserted into the opening means. Attached to the end of upper guide member 522 at the end thereof most adjacent development means 528 is a U-shaped member 412 having a finger 414 extending back toward the direction from which the cassette will be inserted (i.e., toward port 514). Fingers 414, as described above with respect to FIG. 19, are positioned to extend through notches 92 in front wall 82 of cassette top cover 44 and depress movable latch members 104 to thereby release the top cover from the locked position such that it is in condition for appropriate rotational movement, in this position downwardly, about hinges 46. Pivotally mounted to each lower guide member 524 about point 416 is pivot arm 418, the lower portion of which is pivotally mounted at point 420 to arm 422 supported by bracket means 530. Also mounted on arm 422 is spring anchor 426. The upper ends of pivot arm 418 and spring anchor 426 are connected by spring 428 which normally urges arm 418 into the position as shown in FIG. 22, wherein lower guide member 524 is in the uppermost position.

As with the guide members associated with the cassette opening and holding means of FIGS. 19–21, the guide members of means 520 have corresponding side portions terminating in ribs adapted to slide into adjacent channels 108 in the side walls of the cassette upon the insertion thereof into the cassette opening means 520. Adjacent the end of each lower guide member 524 most closely adjacent development means 528, there is a slightly rounded, upwardly extending portion 442 adapted to receive the rounded edge between front wall 82 and top wall 83 of cassette top cover 44, which is now in the inverted or downward position.

When the cassette is inserted in the inverted position into cassette opening means 520, fingers 414 depress movable latch members 104 whereby the cassette top cover 44 is no longer locked to base member 42. Simultaneously, the rounded edge between front wall 82 and top wall 83 of the top cover seats against the slightly rounded portion 442 on each lower guide member 524. Continued movement of the cassette in a direction from left to right causes the downward rotation of cover 44 by action of pivot arm 418 pivoting about point 420. This continued insertion will bring notches 114 in wall 48 of the cassette in alignment with latch members 444 which will be rotated into notches 114 through slots 446 in upper guide members 524 under the urging of spring members 448. If, however, magnetic reed switch S20 fails to detect the presence of a xerographic plate in the cassette, by failing to sense the presence of magnet 34 in a side rail 16 adjacent thereto, solenoid 532 mounted in U-shaped bracket 533 will be actuated thereby causing latch members 444 to be displaced upwardly through linkage with arm 534 pivoting about point 536. This will prevent the cassette from assuming the open position, whereby cover 44 will be rotated upwardly under urging of spring 428 into the closed position. Simultaneously, the cassette will be ejected slightly to the left (i.e., slightly outwardly through port 514).

As indicated above in the portion of this specification relating to the cassette, support rail 64 serves its primary function, at this point in time, by maintaining a xerographic plate within the cassette in proper alignment with the plate path associated with automated plate advancing mechanisms 540, the development means 528, etc. That is, when the cassette is inverted as is necessary for insertion thereof into the printing unit, the upper portions of side rails 16 will seat against the horizontally extending portions of support rail 64 remote from wall 48 and will be supported thereby. As to be described below, plate advancing mechanisms 540 will then automatically cooperate with the notches in the side rails to withdraw the plate from the inverted cassette and transport it toward the development means.

At the same time that the plate-bearing cassette is latched into position, the front end thereof depresses switch S21. The simultaneous indication that there is a xerographic plate in the cassette (as determined by switch S20) and that the cassette is in the most advanced position (as indicated by switch S21) causes motors 538 and 542 to be actuated. Motor 538 is associated with plate advancing mechanisms 540 whereas motor 542 is associated with the means for driving a withdrawn xerographic plate into development means 528. Fingers 248 on plate advancing mechanisms 540 cooperate with notches 28 in side rails 16 of the xerographic plate to advance the plate into contact with drive rollers 544 on opposite sides of shaft 547. As with the plate advancing mechanisms previously described with regard to the charging unit, plate advancing mechanisms 540 have a cam-operated switch (not shown) associated therewith which causes motor 538 to be deactuated after a single revolution of the shaft connecting the opposed mechanisms. This leaves the plate advancing mechanisms in the proper position for the sequential removal of a further xerographic plate upon the insertion of a new cassette, after the operational cycle has continued to the point where the unlatching solenoid 532 has been suitably actuated, the old cassette withdrawn and a new cassette inserted.

Drive rollers 544 are driven by motor 542 by means of drive chain 546. Immediately above drive rollers 544 are pressure rollers 545 supported by support arms 548 which are urged downwardly by action of spring 550. As drive rollers 544 move the xerographic plate into the development means, the outside surfaces of the side rails of the xerographic plate come into contact with drive rollers 552 and 554 also driven by motor 542 by means of drive chain 546. Drive wheel 552 is mounted on assembly 556 which is pivoted about point 558 for horizontal rotation under the urging of spring 560 whereby pressure is maintained in an inward direction such that a xerographic plate passing between, and being driven by, drive rollers 552 and 554 will be maintained in contact therewith.

In its essential elements, development means 528 includes a rigidly mounted backing plate 562 positioned slightly above the path of xerographic plate travel through the development means. Adjacent each side edge of backing plate 562 there are two grooves 564 and 566, similar to the grooves in lower heating block 290 of conditioning means 274, but inverted therefrom since the xerographic plate in the printing unit is in an inverted position. As with the grooves in the aforementioned heating block, the grooves in backing plate 562 are adapted to receive the corresponding portions of each side rail 16 on the respective sides of the xerographic plate adjacent thereto. Positioned adjacent each side edge of backing plate 562, and extending in a direction parallel to the direction of plate movement through the development means, are L-shaped guide elements 568 and 570 separated by a gap through which drive rollers 552 and 554 extend. The lower leg 572 of each L-shaped guide element extends inwardly and it is upon the upper surface thereof that the lower surfaces of the side rails rest as a plate is passed through the development means.

The development means also includes a development chamber 574 resting on inflatable elements 576 supported, in turn, by brackets 578. The walls 580 of chamber 574 terminate, about the upper periphery thereof, in outwardly extending lip 582. Attached to lip 582 is a gasket supporting member 584 having gasket 586 on the upper portion thereof. In FIG. 22, the development chamber is shown in the down position. After a xerographic plate is properly positioned within the development means, the development chamber is raised by a pressurized gas to inflatable elements 576 whereby gasket 586 is caused to seat against non-photoconductive portions of the xerographic plate whereby a leak-tight development chamber is defined.

Within the development chamber, and positioned approximately 1¼ inches from the photoconductive surface of the xerographic plate, there is a grid electrode 588 mounted on support bracket 590. Below the grid electrode and mounted on support bracket 592 is a canopy shaped baffle 594. Extending substantially across the width of the development chamber (i.e., in a direction transverse to the direction of xerographic plate travel through the development means) is an ion generator 596 comprising housing 598, a single corotron wire 600 therein and air inlet ports 602, coupled to a pressurized air source (not shown) by conduit 604. On the opposite wall of housing 598 from the pressurized air entrance ports, but through only that portion of the housing wall directly beneath baffle 594, is a plurality of ionized air egress ports 606 through which ionized air passes into the development chamber 574. Extending through the side wall of the development chamber directly opposite ion generator 596 is a toner entrance port 608, also positioned directly beneath baffle 594, connected to toner aerosol generator 610 coupled to port 608 by flexible coupling 612. Adjacent at least a portion of the side of development chamber 574 are porous pads 614, securely mounted to the external sides of the development chamber, and adapted to permit the passage of air therethrough whereby suitable minimum pressure differential can be maintained between the development chamber and the external environment outside the chamber to prevent pressure buildup in the chamber which would cause seal leakage with attendant leakage of toner to the internal portions of the printer unit. Pads 614 are of limited porosity such that while air flow can be maintained therethrough, toner particles cannot pass therethrough into the internal portions of the printing unit.

At the bottom of the development chamber, in the bottom wall thereof, there is a port 616 through which unused toner is withdrawn during the purge cycle. Port 616 is connected to conduit 618 by means of flexible coupling 620. Inside conduit 618, there is a flapper valve 622 hinged for rotational movement, in the direction as shown by the arrow, about hinge 624. Conduit 618 is connected to toner filter means 625 which, in turn, is connected to blower means (not shown). At the beginning of the purge cycle, valve 622 is moved downward and to the left under the action of rotary solenoid (not shown). This movement of flapper valve 622 places the blower in communication with the development chamber through toner filter means 625, conduit 618 and port 616, whereby unused toner is withdrawn from the development chamber. After the purge cycle, the valve is released from its open position and rotated back into the closed position under urging of a spring (not shown). With the flapper valve in the position as shown in FIG. 22, the blower is connected to the brush cleaning means, to be described hereinafter, through toner filter means 625, port 626 and conduit 627.

At the end of the backing plate 562 most remote from cassette holding means 520, there is a xerographic plate locking means 630 comprising a shaft 632 and, adjacent each end thereof, bracket means 634 having a pin 636 thereon. Attached to shaft 632 is a first arm moves having a slot through which pin 636 passes. Pivotally mounted on L-shaped member 568 at point 640 is a second arm 642 also having a slot therein through which pin 636 passes, whereby proper alignment of the two arms is achieved. Also pivotally mounted about point 640 is arm 644 which, under urging of spring 641 into its normal position as shown in FIG. 22, is aligned horizontally adjacent one end of grooves 564 such that, unless actuated, a xerographic plate cannot be passed through the development means. Associated with locking means 630 is solenoid 646 which, when actuated, moved member 644 into a non-locking position through linkage with arm 648.

In addition to the elements previously described with respect to backing plate 562, the backing plate also has a plurality of apertures 650, 652, 654 and 656 therethrough. The apertures are adapted to receive pins 658 extending upwardly from the movable development chamber 574, pins 658 serving to guide the chamber into the proper sealing position about the photoconductive surface. Mounted on top of plate 562 is switch S22 having an arm depending downwardly through a slot in the backing plate. Positioned adjacent aperture 654 is a switch S23 which is actuated when a pin passes through aperture 654. Directly opposite switch S23 and adjacent aperture 656 is a switch S24 which is actuated when the development chamber 574 is lowered and the pin which had passed through aperture 658 is no longer in contact therewith.

In operation, as the xerographic plate is withdrawn from the cassette and brought into contact with drive rollers 544 whereby it is inserted into the development means, the leading edge thereof comes into contact with an arm on switch S22 which extends through a slot in development chamber backing plate 562. With continued insertion of the xerographic plate into the development means, the arm associated with switch S22 drops off the trailing edge of the xerographic plate, deactuates motor 542 associated with drive rollers 544, 552 and 554, and initiates elevation of the development chamber. The plate overrun, due to the slight continual rotation of drive rollers 552 and 554, brings the plate into contact with horizontally extending arm 644 on brake mechanism 630 whereby the plate is properly positioned within the development means. Pressurized gas is admitted to inflatable elements 576 whereby the development chamber 574 is raised into the upper position where it seats against the xerographic plate to provide a leak-tight development chamber suitable for the development of the latent electrostatic image residing on the downward-facing photoconductive surface. As the chamber is elevated, a pin 658 passes through aperture 654 and comes into contact with switch S23, indicating that the chamber is in the upper position. The movement of the development chamber to the upper position is confirmed by switch S25 (not shown) which monitors the pressure applied to the inflatable elements 576. When both switches S23 and S25 confirm that the development chamber is in the upper position, solenoid 532, associated with the latching mechanism in the cassette holding means, is actuated, moving latch members 444 out of notches 114 thereby causing the cassette to be released and ejected slightly toward port 514 under the action of spring 428. Additionally, the development cycle is initiated.

The development means associated with the printing unit is of the powder cloud type wherein a fine cloud of charge toner particles is created, for example, as shown in U.S. Pat. Nos. 2,812,883 or 2,862,646, and blown into development chamber 574 through port 608. The powder cloud so generated by the powder cloud generator is then mixed with an ion cloud produced by passing pressurized air over corotron wire 600 and then through egress ports 606 in housing 598. The powder cloud and the ion cloud meet under baffle 594 and are thoroughly mixed. Because of the flow rates of the powder cloud generator and the ion generator, the charged powder cloud within the development chamber is caused to swirl out from under baffle 594 toward the upper portion of the development chamber where the charged toner particles are attracted to the oppositely charged latent electrostatic image, whereby the latent image is made visible.

As set forth in co-pending application Ser. No. 832,697 filed June 11, 1969, a positive pressure differential is maintained between the ion generator and the chamber area which prevents the toner particles from entering the ion generator housing and contaminating or clogging the corotron wire or the ion generator egress ports 606. This pressure differential is created and maintained by limiting the number and size of ports 606 in relation to the pressure applied to housing 598 through pressure controlled communication with the pressurized air source. A pressure differential in the range from about 4 inches of water to about 18 inches of water has been successfully utilized to prevent such contamination.

Grid electrode 588, which is biased oppositely from the polarity of the latent electrostatic image, is utilized to remove particles or ions which have the same polarity as the latent electrostatic image and to establish field lines normal to the photoconductive surface whereby the phenomenon of edge depletion is substantially eliminated.

When switches S23 and S25 initiate the development cycle, they do so by actuating master timer means (not shown) which controls the development operations broadly described above in accordance with the following sequence. Initially, pressurized air is continuously applied to the corotron housing. The positive pressure differential thereby established between the ion generator housing and the development chamber proper, in view of the porosity of pads 614, serves to prevent toner particles, subsequently blown into the development chamber, from entering the ion generator housing and adversely affecting the operational characteristics of the ion generator. Then, the toner powder cloud generator is pulsed one or more times to fill the development chamber with a charge of toner particles, the air applied to the corotron housing being at sufficient pressure to prevent toner particles from entering the housing. Typically, pulsation of the toner feed mechanism is on the order of about 0.25–0.6 seconds. The toner powder cloud generator is initially pulsed by itself to avoid discharge of the latent electrostatic image by charged ions blown into the development chamber in the absence of toner particles. Thereafter, the toner powder cloud generator and the ion generators are simultaneously pulsed a plurality of times, for example, six times. The pulsation of the ion generator, by energizing corotron wire 600, is on the order of about 1–3 seconds. A typical pulse-off time period is on the order of about 5 seconds, after which the powder cloud and ion generators are pulsed together (for their respective pulsing periods) and then off a plurality of times, as indicated above, in successive 5-second intervals. The toner cloud and the ion cloud, injected into the development chamber from opposite sides, meet under baffle 594, where they are thoroughly mixed. Due to the flow rates chosen for the ion and powder clouds, the now charged toner cloud swirls out from under the baffle, rises to the top of the development chamber where toner particles, charged to a polarity opposite that of the polarity of the latent electrostatic image, are drawn thereto whereby the latent electrostatic image is made visible. It should be understood that the aforementioned operating characteristics can be varied by the operator or radiologist to give the desired developmental results, e.g., best images for viewing, most efficient use of toner, etc.

At the end of the pulsed development cycle, during which the latent electrostatic image has been made visible by the attraction of oppositely charged toner particles, the master timer means actuates the rotary solenoid associated with flapper valve 622 such that the valve is caused to rotate to the position where the development chamber is in communication with the blower via filter means 625. In addition to actuating the aforementioned blower associated with the purging of unused toner from the development chamber, the master timer means also actuates a second blower (not shown) which provides suction for the vacuum transport assemblies in the gripper bar assembly and the fuser means, to be described hereinafter, and actuates the motor 808 associated with rotating brush 806. Air is drawn into the chamber via filter pads 614 and helps to entrain unused toner. In this manner, unused toner is purged from the development chamber. After the purge is completed, as determined by the purge duration timer normally set for a purge duration on the order of about 6 seconds, the rotary solenoid is de-actuated, whereby flapper valve 622 is spring urged back to the position as shown in FIG. 22. Additionally, at the end of the purge cycle the three-way valve to inflatable elements 576 is opened to the atmosphere, thereby causing the pressurized gas to be released from the inflatable elements whereby the development chamber is lowered from the leak-tight position under the combined influence of gravity and spring means (not shown).

As the development chamber is lowered, a pin 658, passing through aperture 656 in backing plate 562, drops out of contact with switch S24. This, in turn, causes a plurality of functions including the actuation of solenoid 646 which causes horizontally extending brake arm 644 to be rotated downwardly out of the line of xerographic plate travel. Switch S24 also actuates motor 542 driving pinch rollers 552 and 554 which operate on the opposite sides of the xerographic plate and thereby cause the initiation of the movement of the xerographic plate out of the development means. In addition, switch S24 actuates pre-transfer corotron 660, transfer corotron 662, pre-clean corotron 664, causes the transfer of power from block heater 797 to radiant heaters 800 in fuser means 674, and actuates motor 740 which at this point causes no operative movement until such time as clutch (not shown) associated with transfer means 672 and separate clutch (also not shown) associated with gripper bar assembly 750 are actuated.

As a safety mechanism functioning to prevent the accidental withdrawal of a xerographic plate from the cassette before the development cycle has been completed, motor 538 associated with plate advance mechanisms 540 and motor 542 associated with drive wheels 544 cannot be actuated until the development chamber has been lowered and switch S24 actuated. Thus, while a new cassette can be inserted into the printing unit after switches S23 and S25 have caused the unlatching of the previously inserted cassette, it is not until switch S24 is actuated and the development chamber has been lowered that a plate can be withdrawn from the newly-latched cassette.

To complete the xerographic processing cycle, it is necessary to transfer the toner image from the photoconductive surface of the xerographic plate to a suitable support member. This is achieved by withdrawing a single support sheet from supply tray 684 by sheet supply means 670, transporting it by transport means 672 to a point where it is in registration with the xerographic plate having the powder image thereon, transferring the powder image to the support sheet under the influence of transfer corotron 662, transporting the support sheet with the powder image thereon to fuser means 674 from which the permanent reproduction is advanced into receiving tray 676.

When the xerographic plate is brought into registration with the support sheet, they pass over transfer corotron 662 which causes the powder image to be transferred from the xerographic plate to the support sheet. Thereafter, the support sheet, with the powder image thereon, is gripped by gripper means 774 associated with transport means 750 whereby it is moved out of the path of xerographic plate travel into its own path which takes it through fusing means 674, where the powder image is permanently fused to the support sheet and ejected into receiving tray 676. Meanwhile, the xerographic plate passes above pre-clean corotron 664, passes into contact with brush cleaner means 678, where residual toner is removed from the photoconductive surface, and inserted into storage box 150 by drive rollers 680 functioning in cooperation with plate advancing mechanisms 682.

Support sheet supply means 670 adapted for slidable movement into and out of printer 500 through port 686 on right side wall 506 includes tray 684. Adjacent the internal end of tray 684 is an upwardly inclined ramp 690 which guides an individual support sheet into path 692. Adjacent ramp 690 is a sheet feeder mechanism 694 coupled to motor 696 by shaft 698 and drive chains 700. Shaft 698 passes through rigidly mounted bracket 702 and has supported thereon a pair of drive rollers 704 mounted to rotate in a clockwise direction. Adjacent shaft 698 is shaft 706 which is driven by drive chain 708 attached to sprocket wheels on each shaft. On the opposite side of shaft 706 from shaft 698 is another shaft 714 having drive rollers 716 thereon. Shaft 714 is driven in a clockwise direction by transmission belt 718 coupled to the middle portion of shaft 706 and is free to pivot about shaft 706. Rotary solenoid 720 is rigidly mounted on bracket 722 and, when actuated, causes shaft 714 to be pivoted downwardly through downward rotation of arm 724. When solenoid 720 is not actuated, shaft 714 is urged upwardly causing rollers 716 to be out of movement-causing contact with any sheet material in tray 684, by the combined influence of counter weight 726 and the spring urged return action of arm 724. As can best be seen in FIG. 23, beneath drive rollers 704 are rollers 728 also driven in the clockwise direction by motor 696. The vertical spacing between drive rollers 704 and 728 can be adjusted by screw 730 and is normally set to be greater than the thickness of one support sheet but less than the thickness of two support sheets. To continue the withdrawal of a single support sheet from supply means 670 there is provided a pair of drive rollers 732 on shaft 736 driven by motor 696 in a counterclockwise direction. Idle rollers 734, positioned above drive rollers 732 on shaft 738, are free by their own weight to rest upon drive rollers 732 and are caused to rotate in a clockwise direction by frictional contact with drive rollers 732 with a support sheet being passed therebetween. The downward force of idle rollers 734 creates the frictional force allowing rollers 732 to withdraw a single support sheet along path 692.

Adjacent the internal end of support sheet supply means 670, in proper alignment with path 692, is support sheet transport means 672 driven by motor 740 through clutch means (not shown). To direct the support sheet from the internal end of sheet supply means 670, transport means 672 includes curved, opposed guide members 742 and 744. One or more transport belts 746 contact one surface of the support sheet thereby causing it to be transported adjacent guide member 742 in a direction generally upwardly toward the path of xerographic plate travel. The upper portions of guide member 742 and upper guide member 745, as at 748, are curved to provide for the positioning, of a support sheet transported therethrough, essentially tangential to the path of xerographic plate travel. Guide member 745 is spaced from the path of xerographic plate travel so as not to cause adverse contact between guide member 745 and the powder image loosely held on the photoconductive surface.

After the xerographic plate and support sheet have passed over transfer corotron 662 in registration, with the leading edge of the sheet extended slightly in front of the leading edge of the xerographic plate, and the powder image has been transferred to the support sheet, the extended leading edge of the support sheet comes into contact with gripper bar transport assembly 750 which strips the support sheet from the xerographic plate and causes it to be transported downwardly to fusing means 674. The gripper bar transport assembly 750 comprises manifold 752 coupled through port 754 to the second blower means described above. A plurality of openings 756 pass through that wall 758 over which the support sheet is to ride on perforated belts 760 in its downward movement toward the fusing means. Adapted to ride over manifold 752 and adjacent wall 758 are a plurality of perforated belts 760 driven by motor 740 by means of drive chain 762, sprocket wheels 764, drive shaft 766 and gripper bar assembly clutch. Also connected to drive shaft 766 by means of sprocket wheels (not shown) are a plurality of gripper bar assemblies 770 supported by drive chains 772 on each side thereof. Assemblies 770 serve to rotate gripper bars 774 in the same path followed by perforated belts 760. Each gripper bar 774, mounted between drive chains 772, comprises a base plate 776 and a movable gripper plate 778 which has a cam follower arm 780 thereon extending through base plate 776. Plate 778 is normally spring urged into the closed position. As can best be seen in FIG. 22, as each cam follower arm 780 on gripper bar assembly 770 comes into contact with cam 782, the jaws of the gripper bar are opened whereby the leading edge of a support sheet can be inserted therein. Continued movement of the gripper bar transport assembly, now in a downward direction toward the fusing means, causes the jaws of each gripper bar assembly to be closed when cam follower arm 780 no longer is in contact with the accentuated portions of cam 782. When the jaws shut, the leading edge of the support sheet is tightly gripped such that continued rotation of the gripper bar transport assembly in a downward direction causes the support sheet to be stripped from the xerographic plate and transported toward the fuser means. The support sheet, now moving in a downward direction on perforated belts 760, passes over openings 756 in manifold 752. The partial vacuum which is being drawn on manifold 752 causes the support sheet to be tightly held to perforated belts 760 without disturbance of the powder image held on the opposite surface thereof. As the gripper bars move to the bottom position of the gripper bar transport assembly 750, during continued rotation thereof, cam follower arm 780 comes in contact with cam 784 causing the jaws to open, releasing the leading edge of the support sheet whereby the support sheet is caused to pass over guide member 786 at the entrance to the fusing means. Idle rollers 787 assist in the guidance of the support sheet into the fuser means. Since the idle rollers contact the image-bearing surface of the support sheet, care is taken to avoid direct contact with the loosely held image by causing the idle rollers to contact only the margins on each side of the image.

Fuser means 674 includes motor 790 which causes, by means of drive chain 792 and drive shaft 794, the rotation of a plurality of belts 796 about perforated heater block 797 and perforated manifold 798. The apertures in the heater block are aligned with the apertures in the perforated manifold and are so situated as to be positioned between adjacent belts 796. It is upon the upper surface of belts 796 that the support sheet rests as it is transported through the fuser means. Perforated manifold 798 is also coupled to the second blower means described above, the partial vacuum created thereby being sufficient to hold the support sheet to the surfaces of the belts and to assist in the transportation of the support sheet through the fuser means. Above the path of support sheet travel through the fuser means, there are a plurality of radiant energy heating coils 800 disposed beneath a reflector 802, which, in turn, is beneath heat shield 804. The powder image is permanently fused to the support sheet by the combined action of the heating coils 800 and the heat conducted through belts 796 from heating block 797. After the support sheet has passed through the fuser, the now, permanent reproduction is deposited into receiving tray 676 by the continued rotation of belts 796.

After the support sheet, with the powder image thereon, has been stripped from the xerographic plate, the plate passes over pre-clean corotron 664, and into contact with brush cleaner 678. Brush cleaner 678 includes rotating brush 806 driven by motor 808 via belt 809. The rotating brush is within housing 810 having attached to the internal portion thereof flicker arm 812 which comes into contact with the periphery of the rotating brush whereby loosely held toner particles may be removed therefrom. The toner particles are removed from housing 810 under the influence of a partial vacuum drawn on the housing through manifold 814 and conduit 627 which is coupled to the blower, previously utilized to purge the development chamber, via port 626 and filter means 625. The upper portion of housing 810 has a bracket 816 extending above the path of xerographic plate travel and upon which idle rollers 818 on shafts 819 are mounted. The idle rollers serve to maintain a slight downward pressure on the top of the xerographic plate such that the photoconductive surface of the plate comes into slight, non-damaging contact with the rotating brush whereby residual toner is removed from the photoconductive surface.

After the leading edge of the xerographic plate passes brush cleaner 678, it comes into contact with drive rollers 680 on opposite sides of shaft 822, also driven by motor 790 by means of drive chain 792. Drive wheels 680 in combination with plate advancing mechanisms 682 drive the cleaned xerographic plate into storage box 150, which has previously been inserted through port 828 into storage box holding means 830. Plate advancing mechanisms 682, driven by motor 832, are of similar structure to the plate advancing mechanisms previously described, for example, with regard to FIGS. 17 and 18. Fingers 248 on the plate advancing mechanisms 682 cooperate with the trailing edge of the xerographic plate to complete the insertion thereof into the storage box through slot 162.

Since the xerographic plate is traversing the printer unit in an inverted position from the manner in which it traverse the charging unit, storage box 150 is inverted upon insertion into the printing unit, such that when inverted outside the unit during manual transportation between units, the xerographic plates may be automatically withdrawn from the storage box in the charging unit with proper orientation to the operative elements thereof. Accordingly, storage box 150 is inserted into the printing unit with slot 162 at the upper left-hand portion thereof, as can best be seen in FIG. 23.

In a manner, and with structure, similar to that described above with regard to FIGS. 17 and 18, but considered in an inverted sense, the storage box is inserted into the printing unit over lower guide means 833 such that clips 172 come into contact with cam members 216 which cause the clips to be pivoted upwardly whereby slot 162 is completely opened and a xerographic plate can be inserted therethrough. Above upper guide members 835 associated with the storage box receiving means, there is positioned a U-shaped bracket 834 supporting solenoid 836 linked to latch members 838, on opposite sides of shaft 839, by pivot arms 840 and 842. If there is at least one position for the insertion of a xerographic plate within the storage box, as determined by magnetic reed switch S30 outside the storage box but adjacent the uppermost plate position, latch members 838 are rotated into position within notches 184 in the adjacent wall of the storage box by the action of springs 844. Simultaneously during the storage box insertion, the front wall 158 of the storage box comes into contact with spring actuated plungers 845 which are compressed. If, however, the storage box is, or becomes, full, as determined by magnetic reed switch S30, solenoid 836 will be actuated causing latch members 838 to be pulled upwardly by linkage through arms 840 and 842. When latch members 838 are so moved, the storage box will be urged outwardly from its most advanced position by the action of spring loaded plungers 845.

The movement of the development chamber to the upper position, as confirmed by switch S25 which monitors the pressure applied to inflatable elements 576 and switch S23 which is contacted by pin 658 passing through aperture 654, in addition to the previously described functions, also causes the actuation of support sheet feed motor 696, rotary solenoid 720, and motor 740 associated with drive rollers 852 and 856, transport means 672 and gripper bar assembly 750. When rotary solenoid 720 is energized, drive wheels 716, being taken in a clockwise direction, are brought against the upper surface of the top support sheet on the stack of support sheets on tray 684. The clockwise rotation of drive wheels 716 causes the support sheet to be driven into path 692, where it is further advanced by drive rollers 732. Should more than one support sheet be fed from the top of the stack, the counterclockwise rotation of wheels 728 against the lower surface of the bottom sheet causes the sheet or sheets to be urged back toward the stack thereby preventing direct contact with drive rollers 704 and 732. As the support sheet passes through path 692, after passing between rollers 732 and 734, the leading edge thereof strikes arm 850 on switch S26. This deactuates rotary solenoid 720 so that additional support sheets are not withdrawn from tray 684.

As the leading edge of the support sheet leaves path 692, it is guided between guide members 742 and 744 by lips 851 and 853. Continued movement of the support sheet, still being driven by drive rollers 732, causes the leading edge of the support sheet to come into contact with belts 746 which continue the movement of the support sheet in a generally upward direction between guide members 742 and 744. During such movement, the leading edge of the support sheet contacts switch S27 positioned adjacent the path between the guide members and, as the arm on switch S27 drops off the trailing edge of the support sheet, motor 696 associated with supply means 670, motor 740 and the clutch associated with transport means 672 and 750 are deactuated. This positions the leading edge of the support sheet about one quarter to one half inch out of the upper end of the guide means, slightly to the right of point 748, where it is just below the path of travel of the xerographic plate as the plate passes over corotrons 660 and 662. With the paper stationary in this position, switch S28 is in contact therewith and determines the presence of a support sheet in the guide channel.

It has previously been indicated that at the end of the development cycle, flapper valve 622 is caused to rotate to the position where the development chamber is in communication with the blower means via filter means 625. At the completion of the purging operation, the three-way valve to inflatable elements 576 is open to the atmosphere thereby causing the development chamber to be lowered from the leak-tight position whereby pin 658 passing through aperture 656 drops out of contact with switch S24. Before the plate is advanced from the development chamber, a support sheet must be present in the guide channel (as determined by switch S28), fuser means 674 must be within the proper operating limits (as determined by thermoswitch, not shown), the storage box must be properly inserted through port 828 (as determined by switch S29 which is depressed when the storage box is in the latched condition), and that the storage box has at least one empty position for the insertion of a xerographic plate (as determined by magnetic reed switch S30). If, however, one or more of these conditions are not met, the blower will be shut down and the xerographic plate, with the powder image thereon, will not be withdrawn from the development chamber.

When the foregoing conditions are met, a plurality of functions are initiated including the actuation of solenoid 646 which causes horizontally extending brake arm 644 to be rotated downwardly out of the line of xerographic plate travel; the actuation of motor 542 driving pinch rollers 552 and 554 which operate on the opposite sides of the xerographic plate to cause the initiation of movement of the xerographic plate out of the development means; and the actuation of pre-transfer corotron 660, transfer corotron 662, and pre-clean corotron 664. In addition, switch S24 causes the transfer of powder from block heater 797 to radiant heaters 800 in fuser means 674, and actuates motor 740 which drives drive rollers 852 on opposite sides of shaft 854, and drive rollers 856, on opposite sides of shaft 858, by means of drive chain 762.

The operation of the pinch rollers 552 and 554 on opposite sides of the xerographic plate, in combination with the release of brake arms 644, causes the xerographic plate to be advanced out of the development chamber. During such advancement, an arm on switch S31 drops off the trailing edge of the plate thereby actuating motor 790 which drives drive rollers 680 adjacent to the entrance to storage box 150 and the rotary belts 796 in fuser means 674. Simultaneously, clutch means associated with transfer means 672 and motor 740 is energized such that the support sheet, previously moved to the top of transport means 672 is moved in registration with the xerographic plate over transfer corotron 662.

As the xerographic plate moves over pre-transfer corotron 660, the photoconductive surface, and the powder image thereon, are given a uniform electrostatic charge of a first polarity. As the xerographic plate and the support sheet move in registration over transfer corotron 662, the back side of the support sheet is given a uniform electrostatic charge of polarity opposite to the charge applied by the pre-transfer corotron. This causes the oppositely charged powder image to be faithfully transferred from the xerographic plate to the support sheet.

As the leading edge of the support sheet reaches gripper bars 774, an arm on switch S32 thereon drops off the trailing edge of the xerographic plate, energizes clutch means associated with the gripper bar assembly 750 and deactuates motor 542 associated with drive rollers 552 and 554.

As previously indicated, movement of the gripper bar transport assembly 750 toward fusing means 674 causes the jaws of each gripper bar assembly to be closed when cam follower arm 780 no longer is in contact with the accentuated portions of cam 782. When the jaws shut, the leading edge of the support sheet is tightly gripped such that continued rotation of the gripper bar transport assembly in a downward direction causes the support sheet to be stripped from the xerographic plate and transported toward the fuser means. The support sheet passes over openings 756 and manifold 752 as it rides on perforated belts 760. The partial vacuum which is being drawn on manifold 752 causes the support sheet to be tightly held to perforated belts 760 without disturbance of the powder image held on the opposite surface thereof. As the gripper bars move to the bottom position of the gripper bar transport assembly 750, cam follower arm 780 comes in contact with cam 784 causing the jaws to open, releasing the leading edge of the support sheet whereby the support sheet is caused to pass over guide member 786 at the entrance to the fusing means. As the support sheet is directed into the fuser means, the leading edge thereof comes in contact with rotating belts 796, upon the upper surface of which the support sheet rests as it is transported through the fuser means. The partial vacuum created by the blower is transmitted to the support sheet by means of perforated heater block 797 and perforated manifold 798, with the apertures being aligned between adjacent belts 796. The partial vacuum so created is sufficient to hold the support sheet to the surfaces of the belts and to assist in the transportation of the support sheet through the fuser means. Above the path of support sheet travel through the fuser, there are a plurality of radiant energy heating coils 800 disposed beneath reflector 802. The powder image is permanently fused to the support sheet by the combined action of the heating coils 800 and the heat conducted through belts 796 from heating block 797. After the support sheet has passed through the fuser, the xerographic copy is deposited into receiving tray 676 by the continued rotation of belt 796. As the xerographic copy is ejected into the receiving tray, an arm on switch S33 drops off the trailing edge of the support sheet and causes motors 790 and 808 to be deactuated, the transfer of power from radiant heaters 800 to block heaters 797, motor 740 and the two clutch means associated with transport means 672 and gripper bar transport assembly 750 to be deactuated, the gripper bar assembly 750 to be stopped wherever it may be located, and both blowers to be turned off. At this point it should be noted that deactuation of switch S22 during positioning of the next xerographic plate in the development chamber causes the gripper bar assembly 750, previously stopped by action of switch S33, to return to its home position, as shown in FIG. 22, where it is stopped by a detect switch (not shown).

After the support sheet with the powder image thereon has been stripped from the xerographic plate, the plate is driven by the continued rotation of drive wheels 856 over pre-clean corotron 664 and into contact with rotating brush 806 where residual toner particles are removed. Continued movement of the xerographic plate causes it to come into contact with drive rollers 680 which continue the movement of the xerographic plate into the storage box through slot 162. During this movement, an arm on switch S34, adjacent front wall 158 of storage box 150, drops off of the trailing edge of the xerographic plate. This actuates plate advance mechanisms 682 which operate on the trailing edge of the side rails to completely insert the xerographic plate within the storage box. As with the plate advancing mechanisms previously described, plate advancing mechanisms 682 have a cam-operated switch (not shown) associated therewith which causes motor 832 to be deactuated after a single revolution of the shaft connecting the opposed mechanisms. This leaves the plate advancing mechanisms in the proper position for the insertion of a further xerographic plate upon suitable re-actuation of switch S34.

Switch S34 also deactuates pre-transfer corotron 660, transfer corotron 662, pre-clean corotron 664, and de-energizes solenoid 646 associated with brake means 630 adjacent the development chamber whereby horizontal brake arms 644 are elevated into the stopped position. If the storage box has at least one additional position for the insertion of a processed xerographic plate, the storage box will remain in the latched condition; however, if the storage box is full, as determined by magnetic reed switch S30 adjacent the uppermost plate position, and the storage box is physically present in the latched condition, as determined by switch S29, solenoid 836 will be actuated thereby causing latch members 838 to be rotated upwardly such that storage box 150 will be ejected under the action of spring actuated plungers 845. When the storage box is so released, the storage box presence switch S29 is deactuated. This causes solenoid 836 to be deactuated whereby a new box can be inserted and latched, if the appropriate conditions are met.

Pre-transfer corotron 660, transfer corotron 662 and pre-clean corotron 664 are of the general type of corona discharge units described in Vyverberg U.S. Pat. No. 2,836,725. The corotrons consist of a flat sided U-shaped channel, having inwardly bent lips, and a single corona wire strung between insulating blocks mounted on either end of the channel. Normally, the U-shaped channel, or shield, of this unit is maintained at ground potential. The wire is fed from a high voltage source and the xerographic plate, or the support sheet, is moved relative to the wire at a uniform rate of speed to thereby place a uniform electrostatic charge on the adjacent photoconductive or support sheet surface. If desired, other types of corona charging devices, for example, as shown in numerous other patents assigned to Xerox Corporation, or even other types of electrostatic charging devices can be employed.

Although not specifically described herein, appropriate electronic circuitry and components are provided which, in combination with the numerous switches described above, cause the proper functioning of the automated processing units herein described.

Referring to FIG. 27 there is seen a schematic illustration of the operative elements of the automated, flat-plate xerographic processing system herein described showing the relationship of the two automated processing units to each other and to the external exposure station. Storage box 150 is inserted into charging unit 200 through port 210. A xerographic plate 10, with the photoconductor layer on the top side, is withdrawn therefrom and passed to conditioning means 274 where it is maintained at the appropriate temperature for a predetermined period of time whereby the residual image normally associated with the exposure of xerographic plates to high energy penetrating radiation, such as X-rays, is eliminated. After the predetermined conditioning period, the xerographic plate is withdrawn from the conditioning means 274 and passed to storage magazine 280 where it is cooled to the proper xerographic processing temperature by means of air drawn about the xerographic plate by cooling fan 320. In accordance with operating conditions previously described, upon insertion of an empty cassette 40 through port 340 in charging unit 200, xerographic plate 10 is withdrawn from storage magazine 280, passed beneath vacuum cleaning means 366 and uniform electrostatic charging means 348 and into cassette 40, which is automatically released and closed whereby the uniformly charged xerographic plate is held in a light-tight environment.

Upon withdrawal of the plate-bearing cassette from the charging unit, it is taken to an external exposure station, properly positioned with respect to the radiation source and the object being examined, and exposed to imaging radiation in accordance with conventional techniques.

Thereafter, the cassette, with the latent electrostatic image-bearing xerographic plate therein, is inverted and inserted into printing unit 500 through port 514. If the operating conditions previously described are met, the cassette is automatically opened and the xerographic plate, held in proper alignment with the xerographic plate processing path by the internal structure of the cassette, is withdrawn and transported to powder cloud development means 528. During development, a single support sheet is withdrawn from support sheet supply means 670. This sheet is transported by transport means 672 to a point adjacent the path of xerographic plate travel during its advancement from the development chamber, where the sheet is stopped. After development, the xerographic plate, with the powder image thereon, is transported out of the development means, over pre-transfer corotron 660 which uniformly charges the photoconductive surface and the powder image to a first polarity. As the leading edge of the xerographic plate comes into registration with the stationary support sheet, they are caused to move in synchronization over transfer corotron 662 which charges the back side of the support sheet to a polarity opposite the charging polarity utilized by pre-transfer corotron 660, whereby the powder image is transferred to the support sheet. Continued movement of the xerographic plate in synchronization with the underlying support sheet causes the support sheet with the toner image thereon to come in contact with gripper bar transport assembly 750 which strips the support sheet from its position adjacent the xerographic plate and transports the support sheet to fuser means 674 where the powder image is permanently bonded to the support sheet surface. Continued rotation of belt transport means 796 within the fuser means causes the ejection of the xerographic copy into receiving tray 676.

After the support sheet has been stripped from its position adjacent the xerographic plate, the plate passes over pre-clean corotron 664 and into contact with brush cleaner 678 which removes residual toner from the photoconductive surface. The movement of the plate is continued into inverted storage box 150. To complete the cycle, it is only necessary to withdraw storage box 150 from printing unit 500 through port 828, invert the storage box such that slot 162 is in the lower left-hand corner, and insert the storage box into charging unit 200 through port 210. In this manner, the xerographic plates can be reused for subsequent xerographic processing.

As previously indicated, the present invention is adapted for use in the field of medical diagnostics, especially in xeroradiographic examination for breast cancer in women. The system described herein enables the radiologist to selectively position that portion of the patient's body undergoing examination between the radiation source and the xerographic plate. Since the xerographic plate is protected by a smooth-surfaced cassette, this positioning can be done with a minimum of inconvenience to the patient and a minimized possibility of damage to the xerographic plate. Additionally, with the exception of the manual transportation of the cassette from the charging unit to the external exposure station and from the external exposure station to the printing unit, and the manual transportation of the storage box from the printing unit to the charging unit, the xerographic processing operations have been substantially completely automated such that this xeroradiographic technique is more suited for use in today's clinical environment.

While the invention has been described with reference to specific embodiments thereof, it will be understood by those skilled in the art that various changes may be made and equivalents may be substituted for elements thereof without departing from the true spirit and scope of the invention. In addition, many modifications may be made to adapt a particular situation, material or structural design, to the spirit of the present invention without departing from its essential teachings.

What is claimed is:

1. An automated flat-plate xerographic processing system comprising charging means for placing a uniform electrostatic charge on the photoconductive surface of a xerographic plate, means for holding and opening a light-tight cassette into which said xerographic plate can be inserted, means for inserting said uniformly charged xerographic plate into said cassette without disturbing the uniform electrostatic charge thereon, means to close said cassette after said xerographic plate has been inserted therein whereby said xerographic plate is maintained in a light-tight environment, means for receiving said xerographic plate-holding cassette after imaging exposure, said xerographic plate having thereon a latent electrostatic image suitable for development, means for opening said cassette without further exposure of said xerographic plate to actinic electromagnetic radiation, means for withdrawing said latent electrostatic image-bearing xerographic plate from said cassette, means for developing said latent electrostatic image to form a reproduction thereof suitable for visual examination, and means for advancing said xerographic plate without disturbing the latent electrostatic image thereon to said developing means.

2. The system of claim 1 wherein said means for receiving said latent electrostatic image-bearing xerographic plate-holding cassette after imaging exposure receives said cassette in an inverted position from the position in which said cassette is held by said holding means as said xerographic plate is being inserted therein.

3. The system of claim 1 further including means for transferring the developed image from said xerographic plate to a support surface and means for fixing said developed image to said support surface whereby a permanent xerographic copy is obtained.

4. The system of claim 1 further including a magazine for the storage of a plurality of xerographic plates, means for withdrawing a xerographic plate from said magazine and means for advancing said xerographic plate past said charging means.

5. The system of claim 1 further including means to condition said xerographic plate to thereby eliminate residual xerographic plate effects associated with previous exposure of said xerographic plate to actinic electromagnetic radiation.

6. The system of claim 5 further including means for transporting a conditioned xerographic plate from said conditioning means to said charging means.

7. The system of claim 1 further including means to receive a storage box having at least one xerographic plate therein, means to withdraw a xerographic plate from said storage box and advance said xerographic plate to said charging means.

8. The system of claim 3 further including means to clean said xerographic plate after said developed image has been transferred therefrom to said support surface.

9. The system of claim 3 further including means to receive a storage box, means to advance said xerographic plate to said storage box after the developed image has been transferred therefrom to said support surface, and means to insert said xerographic plate into said storage box.

10. The system of claim 1 wherein said cassette closing means includes means to automatically close said cassette upon insertion of said uniformly charged xerographic plate into said cassette.

11. An automated flat-plate xerographic processing system comprising first means to receive a storage box having at least one xerographic plate therein, means to withdraw a xerographic plate from said storage box, means to condition said xerographic plate to eliminate the residual effects associated with previous exposure of said xerographic plate to high energy, penetrating actinic electromagnetic radiation, means to advance said xerographic plate from said withdrawal means into said conditioning means, a magazine for the storage of a plurality of conditioned xerographic plates, means to advance said xerographic plate from said conditioning means into said magazine, charging means for placing a uniform electrostatic charge on the photoconductive surface of said xerographic plate, means for holding and opening a light-tight cassette into which said xerographic plate can be inserted, means for inserting said uniformly charged xerographic plate into said cassette without disturbing the uniform electrostatic charge thereon, means for withdrawing a xerographic plate from said magazine, means for transporting said xerographic plate past said charging means to said inserting means, means to close said light-tight cassette after said xerographic plate has been inserted therein whereby said uniformly charged xerographic plate is maintained in a light-tight environment, means for receiving said xerographic plate-holding cassette after imaging exposure, said xerographic plate having thereon a latent electrostatic image suitable for development, means for opening said cassette without further exposure of said xerographic plate to additional actinic electromagnetic radiation, means for withdrawing said latent electrostatic image-bearing xerographic plate from said cassette, means to develop said latent electrostatic image on said xerographic plate by applying a developer material thereto thereby converting said latent electrostatic image to a corresponding xerographic powder image, means for advancing said xerographic plate from said withdrawal means to said developer means, means for advancing said xerographic plate from said developer means after development has been completed, means for positioning a support sheet in registration with the powder image-bearing side of said xerographic plate, means for moving said support sheet and said xerographic plate in synchronization, means for transferring said xerographic powder image from said xerographic plate to said support sheet, means for fixing said xerographic powder image to said support sheet, means for removing said support sheet with the xerographic powder image thereon from its position adjacent said xerographic plate and for transporting said powder image-bearing support sheet to said fixing means, means to clean said xerographic plate after said xerographic powder image has been transferred therefrom to said support sheet, second means to receive a storage box, means to advance a cleaned xerographic plate to said storage box, and means to insert said cleaned xerographic plate into said storage box.

12. The system of claim 11 wherein said means for receiving said latent electrostatic image-bearing xerographic plate-holding cassette after imaging exposure receives said cassette in an inverted position from the position in which said cassette is held by said holding and opening means as said xerographic plate is being inserted therein; and said second means for receiving said storage box receives said storage box in an inverted position from the position in which said storage box is held by said first receiving means when said xerographic plate is being withdrawn therefrom.

13. The system of claim 11 wherein said cassette closing means includes means to automatically close said cassette upon insertion of said uniformly charged xerographic plate into said cassette.

14. A charging apparatus for use in conjunction with an automated flat-plate xerographic processing system comprising means for placing a uniform electrostatic charge on the photoconductive surface of a xerographic plate, said charging means including means for causing relative movement of said xerographic plate and said charging means, means for holding and opening a light-tight cassette into which a xerographic plate can be inserted and means for inserting said uniformly charged xerographic plate into said cassette without disturbing the uniform electrostatic charge thereon.

15. The charging apparatus of claim 14 further including means to close said cassette after said uniformly charged xerographic plate has been inserted therein whereby said xerographic plate is maintained in a light-tight environment.

16. The charging apparatus of claim 15 wherein said cassette closing means includes means to automatically close said cassette upon insertion of said uniformly charged xerographic plate into said cassette.

17. The charging apparatus of claim 14 further including a magazine for the storage of a plurality of xerographic plates, means for withdrawing a xerographic plate from said magazine, and means for advancing said xerographic plate from said withdrawal means to said charging means.

18. The charging apparatus of claim 17 further including means to draw ambient air over the xerographic plates stored within said magazine.

19. The charging apparatus of claim 14 further including means to condition said xerographic plate to thereby eliminate the residual effects associated with previous exposure of said xerographic plate to high energy, penetrating actinic electromagnetic radiation.

20. The charging apparatus of claim 19 further including means for transporting a conditioned xerographic plate to said charging means.

21. The charging apparatus of claim 19 further including a magazine for the storage of a plurality of xerographic plates and means for transporting a conditioned xerographic plate to said magazine.

22. The charging apparatus of claim 14 further including means for receiving a storage box having at least one xerographic plate therein, means for withdrawing a xerographic plate from said storage box, and means for advancing said xerographic plate to said charging means.

23. The charging apparatus of claim 19 further including means for receiving a storage box having at least one xerographic plate therein, means for withdrawing a xerographic plate from said storage box, and means for advancing said xerographic plate into said conditioning means.

24. A charging apparatus for use in conjunction with an automated flat-plate xerographic processing system comprising means for receiving a storage box having at least one xerographic plate therein, means for withdrawing a xerographic plate from said storage box, means to condition said xerographic plate to thereby eliminate the residual effects associated with previous exposure of said xerographic plate to high energy, penetrating actinic electromagnetic radiation, means for advancing said xerographic plate into said conditioning means, a magazine for the storage of a plurality of conditioned xerographic plates, means for advancing a conditioned xerographic plate from said conditioning means to said magazine, means for withdrawing a xerographic plate from said magazine, charging means for placing a uniform electrostatic charge on the photoconductive surface of said xerographic plate, said charging means including means for causing relative movement of said xerographic plate and said charging means, means for holding and opening a light-tight cassette into which a xerographic plate can be inserted, and means for inserting said uniformly charged xerographic plate into said cassette without disturbing the uniform electrostatic charge thereon.

25. The charging apparatus of claim 24 further including means to close said cassette after said uniformly charged xerographic plate has been inserted therein whereby said xerographic plate is maintained in a light-tight environment.

26. The charging apparatus of claim 25 wherein said cassette closing means includes means to automatically close said cassette upon insertion of said uniformly charged xerographic plate into said cassette.

27. The charging apparatus of claim 24 further including means to draw ambient air over conditioned xerographic plates stored within said magazine.

28. A printing apparatus for use in conjunction with an automated flat-plate xerographic processing system comprising means for receiving a xerographic plate-holding cassette, said xerographic plate having thereon a latent electrostatic image suitable for development, means for opening said cassette without further exposure of said xerographic plate to actinic electromagnetic radiation, means for withdrawing said latent electrostatic image-bearing xerographic plate from said cassette, means for developing said latent electrostatic image on said xerographic plate to form a reproduction thereof suitable for visual examination, and means for advancing said xerographic plate without disturbing the latent electrostatic image thereon to said developing means.

29. The printing apparatus of claim 28 wherein said developing means comprises means for applying a developer material to said xerographic plate thereby converting said latent electrostatic image thereon to a corresponding xerographic powder image.

30. The printing apparatus of claim 29 further including means for transferring said xerographic powder image from said xerographic plate to a support surface and means for fixing said xerographic powder image to said support surface.

31. The printing apparatus of claim 30 further including means for cleaning said xerographic plate after said xerographic powder image has been transferred therefrom to said support surface.

32. The printing apparatus of claim 30 further including means to receive a storage box, means for advancing said xerographic plate to said storage box after said xerographic powder image has been transferred therefrom to said support surface, and means for inserting said xerographic plate into said storage box.

33. The printing apparatus of claim 28 wherein said cassette opening means includes means to automatically close said cassette upon insertion of said xerographic plate-holding cassette therein.

34. The printing apparatus of claim 28 wherein said cassette is positioned in said cassette receiving means and said cassette opening means so that said xerographic plate is supported by the base member of said cassette in proper alignment with the path of travel to be followed by said xerographic plate during the advancement thereof to said developing means.

35. A printing apparatus for use in conjunction with an automated flat-plate xerographic processing system comprising means for receiving a xerographic plate-holding cassette, said xerographic plate having thereon a latent electrostatic image suitable for development, means for opening said cassette without further exposure of said xerographic plate to actinic electromagnetic radiation, means for withdrawing said latent electrostatic image-bearing xerographic plate from said cassette, means for developing said latent electrostatic image on said xerographic plate to form a reproduction thereof suitable for visual examination, said developing means including means for applying a developer material to said xerographic plate thereby converting said latent electrostatic image thereon to a corresponding xerographic powder image, means for advancing said xerographic plate from said withdrawal means without disturbing the latent electrostatic image thereon to said developing means, means for advancing said xerographic plate from said developing means after development has been completed, means for transferring said xerographic powder image from said xerographic plate to a support sheet, means for fixing said xerographic powder image to said support sheet, means for advancing said xerographic powder image-bearing support sheet away from said xerographic plate and for transporting said powder image bearing support sheet to said fixing means, means for cleaning said xerographic plate after said xerographic powder image has been transferred therefrom to said support sheet, and means for advancing said xerographic plate from said transfer means to said cleaning means.

36. The printing apparatus of claim 35 further including means to receive a storage box, means to advance said cleaned xerographic plate from said cleaning means to said storage box, and means for inserting said cleaned xerographic plate into said storage box.

37. The printing apparatus of claim 35 wherein said xerographic powder image transfer means comprises means for positioning a support sheet in registration with the powder image-bearing side of said xerographic plate, means for moving said support sheet and said xerographic plate in synchronization, and means for transferring said xerographic powder image from said xerographic plate to the adjacent surface of said support sheet.

38. A charging apparatus for use in conjunction with an automated flat-plate xerographic processing system comprising means for receiving a storage box having at least one xerographic plate therein; means to condition a xerographic plate withdrawn from said storage box to thereby eliminate the residual effects associated with previous exposure of said xerographic plate to high energy, penetrating actinic eletromagnetic radiation; a magazine for the storage of a plurality of xerographic plates; charging means for placing a uniform electrostatic charge on the photoconductive surface of said xerographic plate; means for holding and opening a light-tight cassette into which said xerographic plate can be inserted; and means for withdrawing said xerographic plate from said storage box, for transporting said xerographic plate in operative relationship to said conditioning means, said magazine and said charging means, and for inserting said charged xerographic plate into said cassette without disturbing the uniform electrostatic charge thereon.

39. The charging apparatus of claim 38 further including means to close said cassette after said uniformly charged xerographic plate has been inserted therein whereby said xerographic plate is maintained in a light-tight environment.

40. The charging apparatus of claim 38 wherein said cassette closing means includes means to automatically close said cassette upon insertion of said uniformly charged xerographic plate into said cassette.

41. A charging apparatus for use in conjunction with an automated flat-plate xerographic processing system comprising means for receiving a storage box having at least one xerographic plate therein; means to condition a xerographic plate withdrawn from said storage box to thereby eliminate the residual effects associated with previous exposure of said xerographic plate to high energy, penetrating actinic electromagnetic radiation; a magazine for the storage of a plurality of conditioned xerographic plates; means for withdrawing a xerographic plate from said storage box and for transporting said withdrawn xerographic plate adjacent to or through said conditioning means and into said magazine; charging means for placing a uniform electrostatic charge on the photoconductive surface of said xerographic plate; means for holding and opening a light-tight cassette into which said xerographic plate can be inserted; and means for withdrawing a xerographic plate from said magazine, for transporting said xerographic plate past said charging means, and for inserting said charged xerographic plate into said cassette without disturbing the uniform electrostatic charge thereon.

42. The charging apparatus of claim 41 further including means to close said cassette after said uniformly charged xerographic plate has been inserted therein whereby said xerographic plate is maintained in a light-tight environment.

43. The charging apparatus of claim 41 wherein said cassette closing means includes means to automatically close said cassette upon insertion of said uniformly charged xerographic plate into said cassette.

44. The charging apparatus of claim 41 further including means to draw ambient air over conditioned xerographic plates stored within said magazine.

45. A printing apparatus for use in conjunction with an automated flat-plate xerographic processing system comprising means for receiving a xerographic plate-holding cassette including means for opening the cassette without further exposure of the xerographic plate therein to actinic electromagnetic radiation, the xerographic plate having thereon a latent electrostatic image suitable for development, means for developing the latent electrostatic image on the xerographic plate to form a reproduction thereof suitable for visual examination, said developing means including means for applying a developer material to the xerographic plate thereby converting the latent electrostatic image thereon to a corresponding xerographic powder image, means for withdrawing the latent electrostatic image-bearing xerographic plate from the cassette and for advancing the xerographic plate without disturbing the latent electrostatic charge thereon to said developing means, means for advancing the powder image-bearing xerographic plate from said developing means to a transfer station, means in the transfer station for transferring the xerographic powder image from the xerographic plate to a support sheet adjacent thereto, means for fixing the xerographic powder image to the support sheet, and means for positioning a support sheet in registration with the powder image-bearing side of the xerographic plate in the transfer station and for advancing the xerographic powder image-bearing support sheet away from the xerographic plate along a path in operative relationship to said fixing means.

46. The printing apparatus of claim 45 wherein said cassette receiving means includes means to automatically open the cassette upon insertion of the cassette into said cassette receiving means.

47. The printing apparatus of claim 45 wherein the xerographic plate and the support sheet are caused to move in synchronized adjacency within said transfer station.

48. The printing apparatus of claim 45 further including means for cleaning the xerographic plate after the xerographic powder image has been transferred therefrom to the support sheet, and means for receiving a storage box, said means for advancing the xerographic plate from said developing means further serving to advance the xerographic plate in operative relationship to said cleaning means and for inserting the cleaned xerographic plate into the storage box.

49. A printing apparatus for use in conjunction with an automated flat-plate xerographic processing system comprising means for receiving a xerographic plate-holding cassette including means for opening the cassette without further exposure of the xerographic plate therein to actinic electromagnetic radiation, the xerographic plate having thereon a latent electrostatic image suitable for development; means for developing the latent electrostatic image on the xerographic plate to form a reproduction thereof suitable for visual examination, said developing means including means for applying a developer material to the xerographic plate thereby converting the latent electrostatic image thereon to a corresponding xerographic powder image; means for transferring the xerographic powder image from the xerographic plate in a transfer station to a support sheet adjacent thereto; means for fixing the xerographic powder image to the support sheet; means for positioning a support sheet in registration with the powder image-bearing side of the xerographic plate in the transfer station and for advancing the xerographic powder image-bearing support sheet away from the xerographic plate along a path in operative relationship to said fixing means; means for cleaning the xerographic plate after the xerographic powder image has been transferred therefrom to the support sheet; means to receive a storage box; and means for withdrawing the latent electrostatic image-bearing xerographic plate from the cassette, for advancing the xerographic plate without disturbing the latent electrostatic image thereon to said developing means, for advancing the powder image-bearing xerographic plate from said developing means in operative relationship to said transfer means and said cleaning means, and for inserting the cleaned xerographic plate into the storage box.

* * * * *